United States Patent [19]
Rudd et al.

[11] 3,860,778
[45] Jan. 14, 1975

[54] MELT WELDING BY HIGH FREQUENCY ELECTRICAL CURRENT

[75] Inventors: Wallace C. Rudd, Larchmont, N.Y.; Humfrey N. Udall, Darien, Conn.

[73] Assignee: Thermatool Corp., Stamford, Conn.

[22] Filed: Mar. 8, 1974

[21] Appl. No.: 449,371

[52] U.S. Cl. .................. 219/67, 219/9.5, 219/102, 219/104
[51] Int. Cl. ............................................ B23k 11/08
[58] Field of Search ............ 219/67, 102, 104, 106, 219/107, 108, 64, 117, 6.5, 7.5, 8.5, 9.5

[56] References Cited
UNITED STATES PATENTS

| | | | |
|---|---|---|---|
| 2,066,668 | 1/1937 | Bennett | 219/67 |
| 2,938,993 | 5/1960 | Rudd | 219/8.5 X |
| 3,542,992 | 11/1970 | Sennello | 219/67 X |
| 3,591,757 | 7/1971 | Rudd | 219/102 X |

*Primary Examiner*—Bruce A. Reynolds
*Attorney, Agent, or Firm*—Brooks, Haidt and Haffner

[57] ABSTRACT

Methods and apparatus for producing melt welds between a plurality of metal parts in which a high frequency current is caused to flow between two areas on opposite sides of the desired melt weld for a time sufficient to melt the metal between such areas, the molten metal then being permitted or caused to cool. The frequency of the current is selected in relation to the characteristics, both electrical and mechanical, of the parts to be welded and so as to provide a current magnitude which will not cause expulsion of the molten metal by reason of the motor effect. The current frequency is selected to be at least high enough to provide an effective resistance of the metal which is at least equal to the contact resistance between the parts. The apparatus may include high temperature insulating material for confining the molten metal, proximity conductor means for influencing the current path and/or magnetic means adjacent the current path for concentrating the current.

27 Claims, 45 Drawing Figures

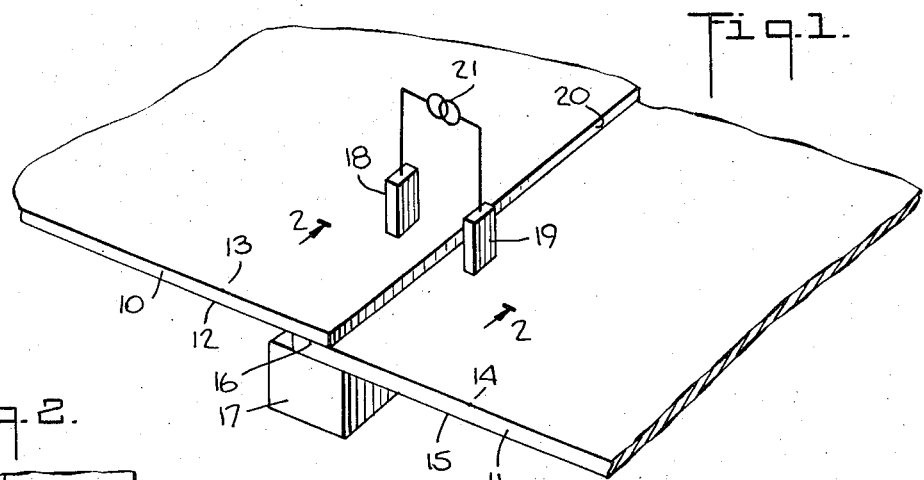
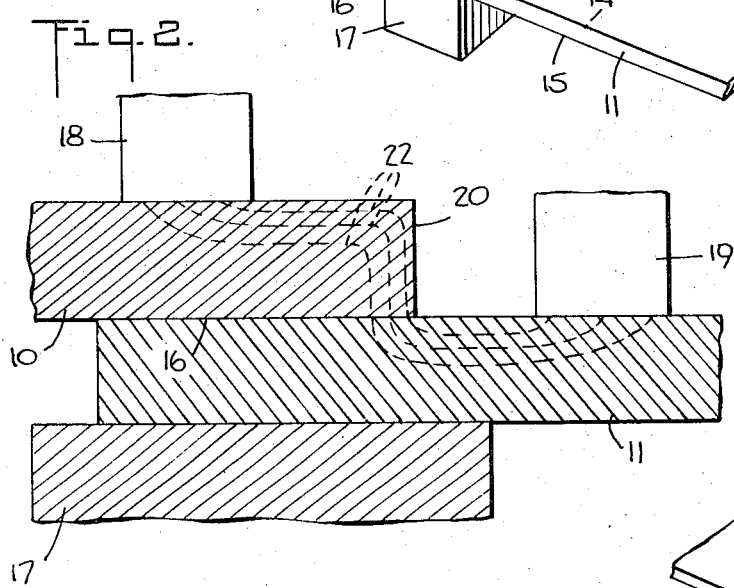
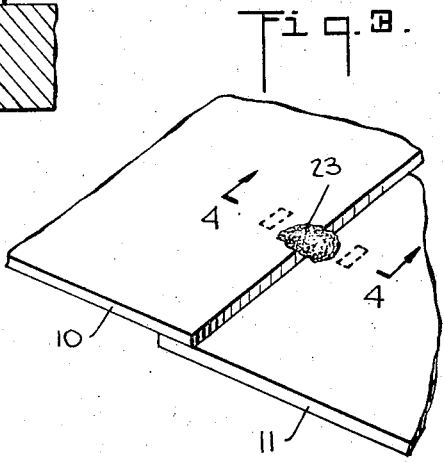
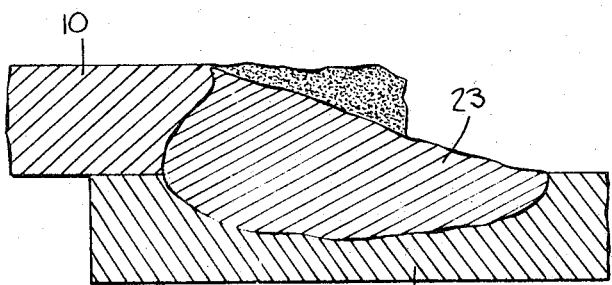
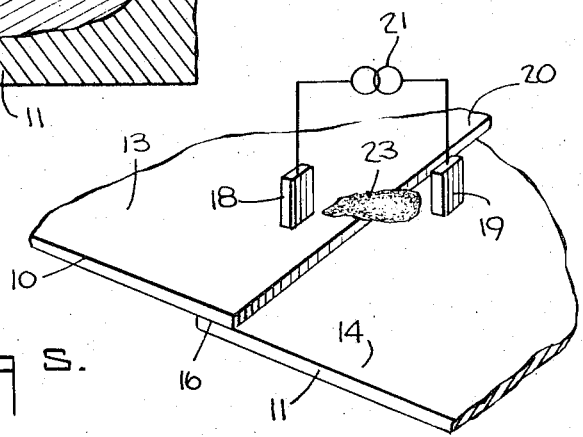

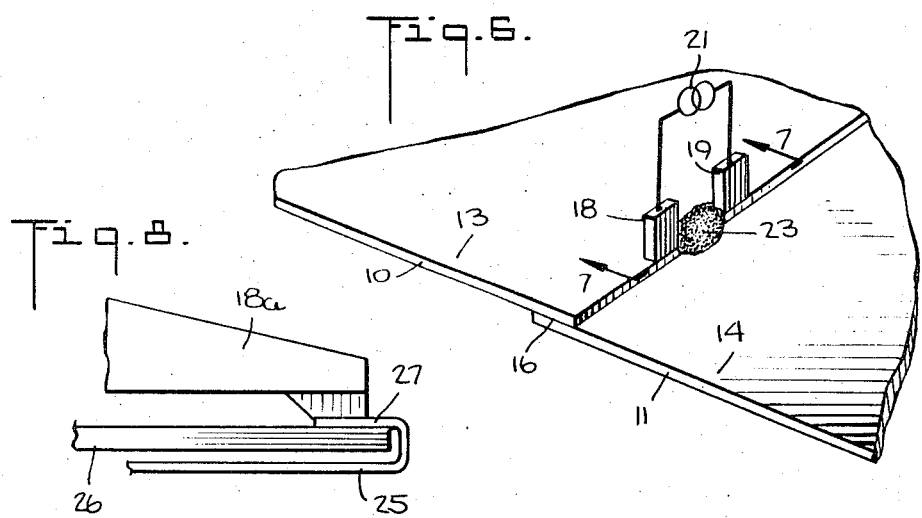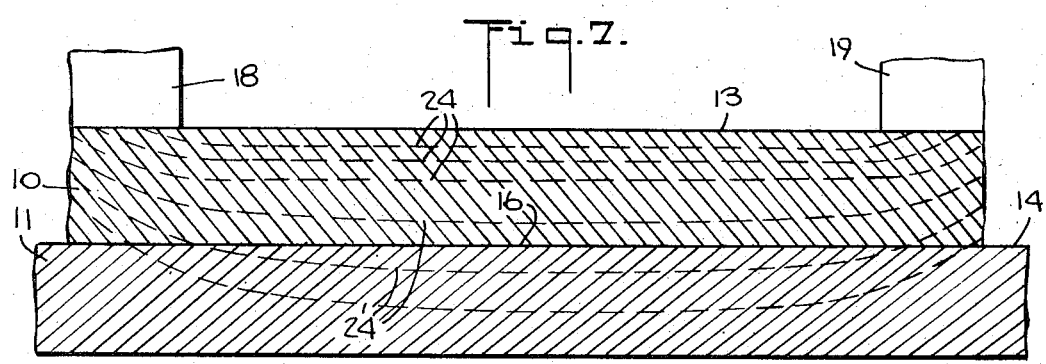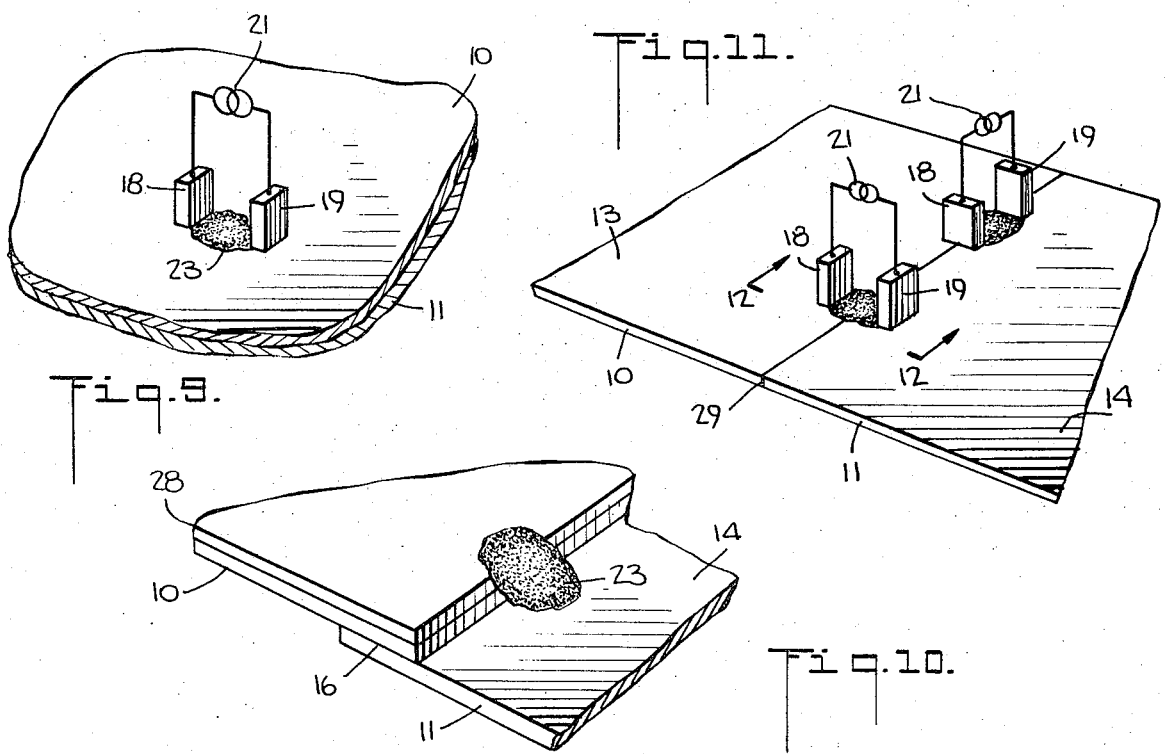

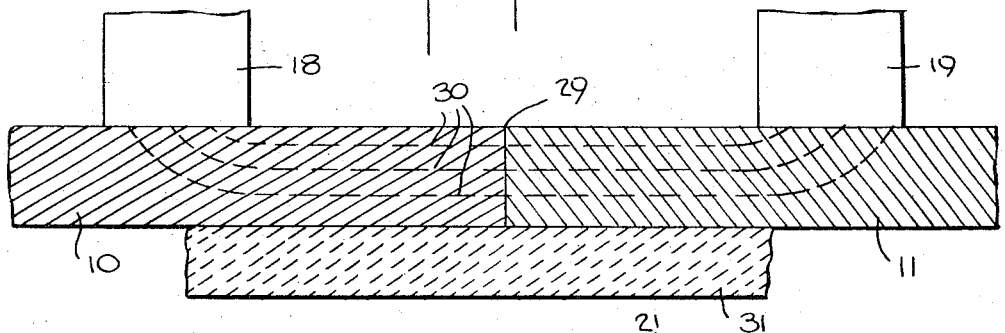
Fig. 12.
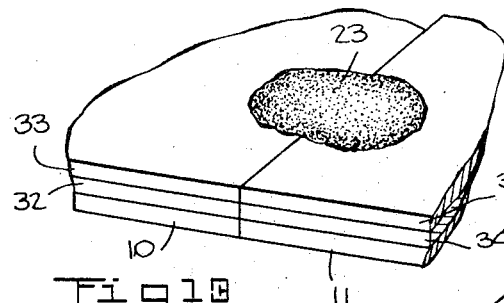
Fig. 13.
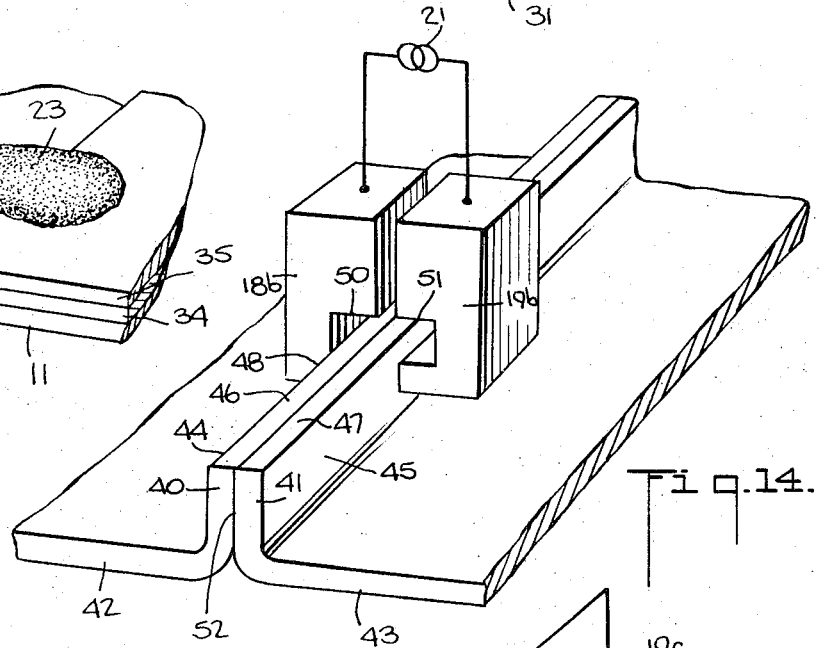
Fig. 14.
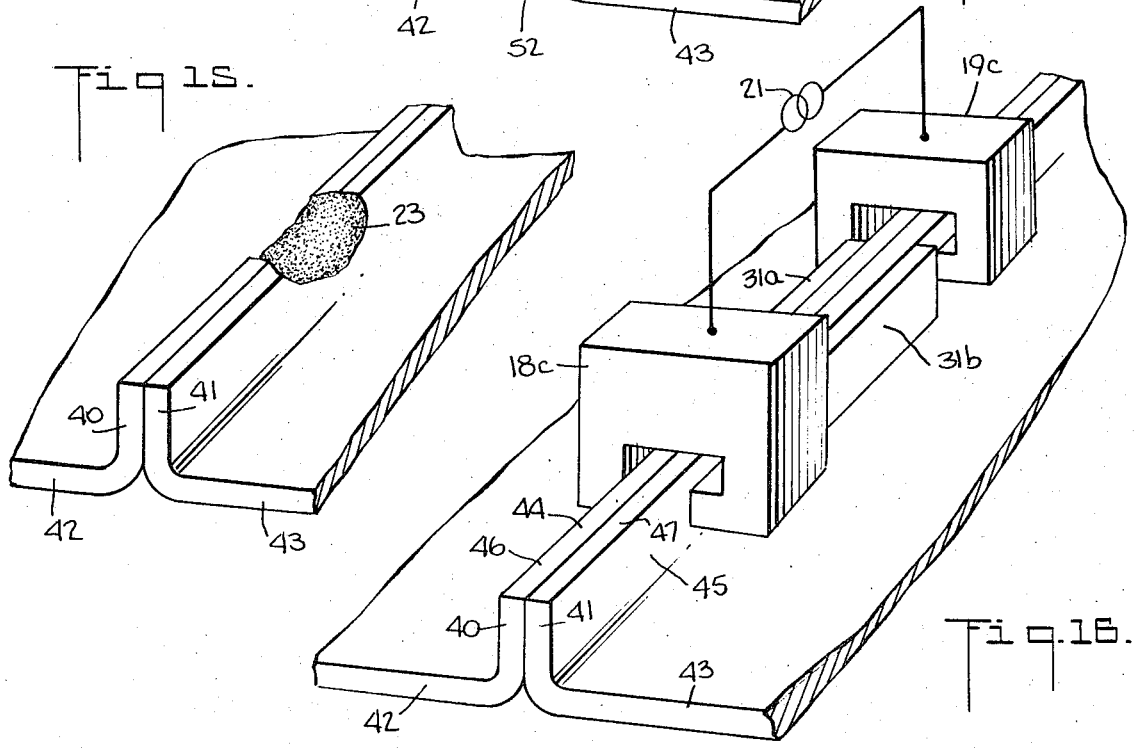
Fig. 15.
Fig. 16.

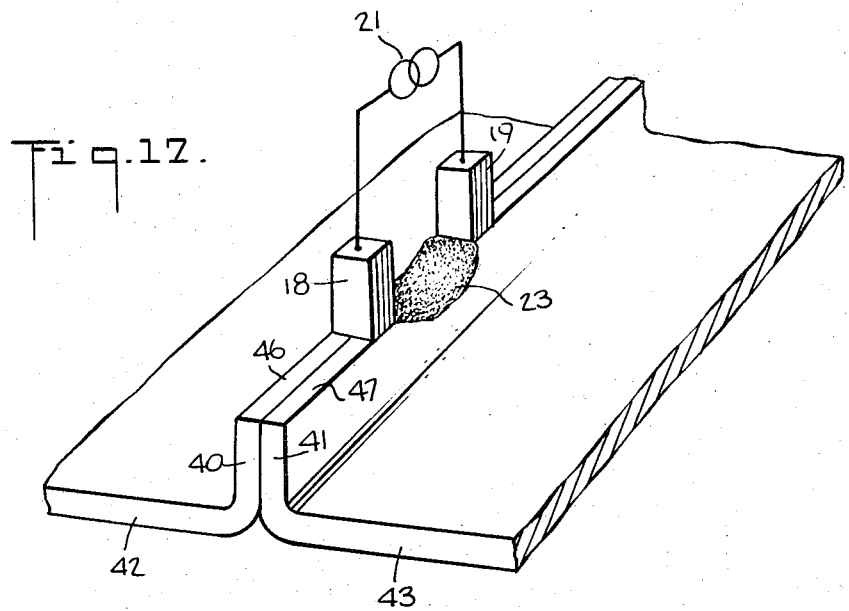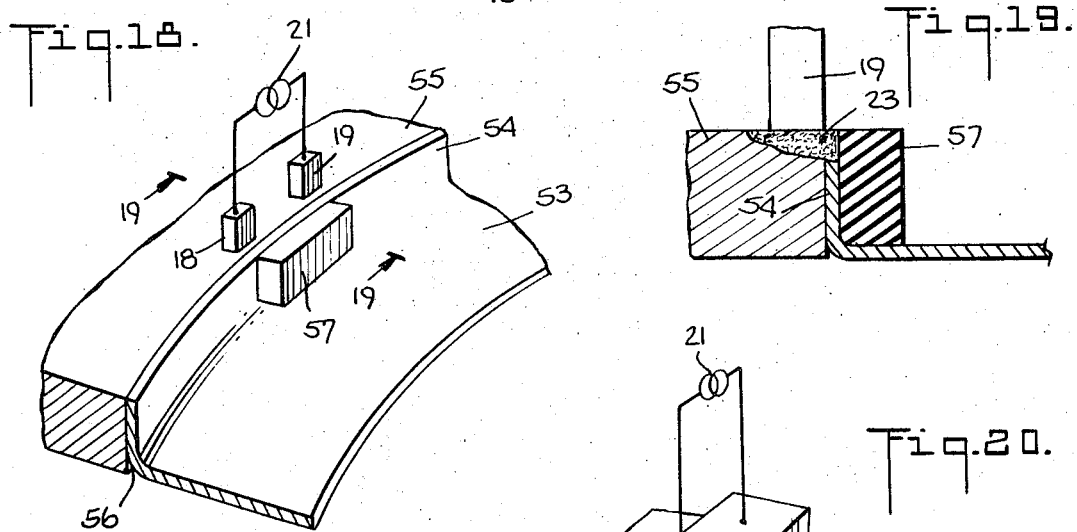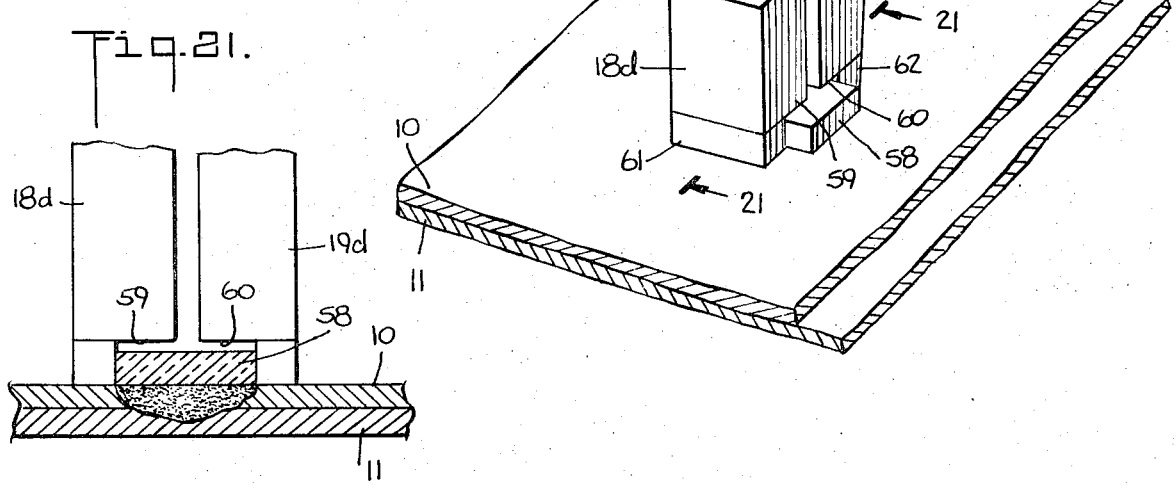

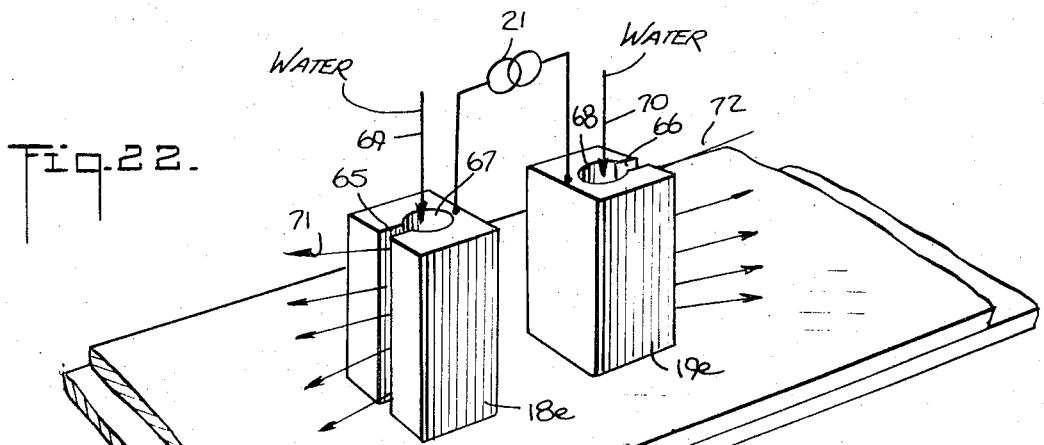
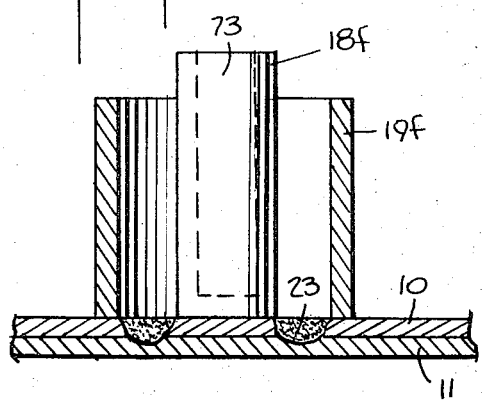
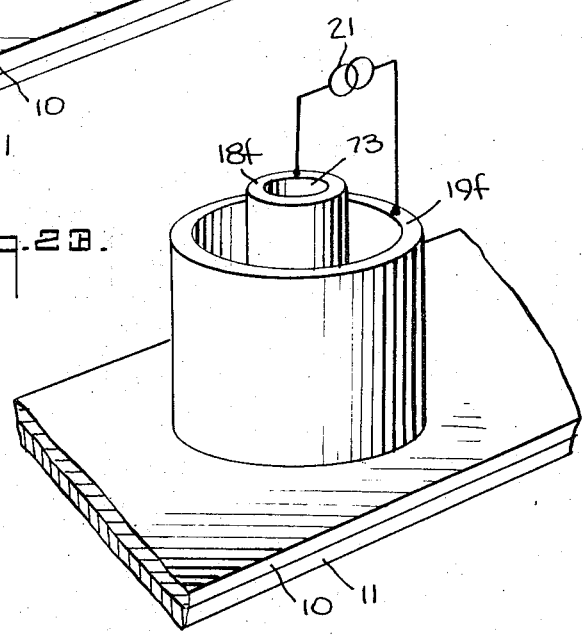
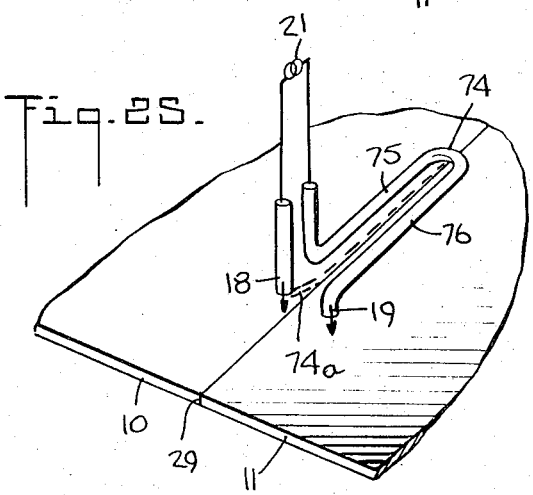
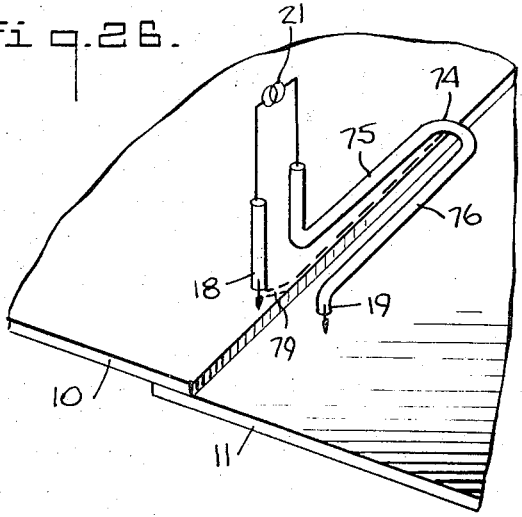

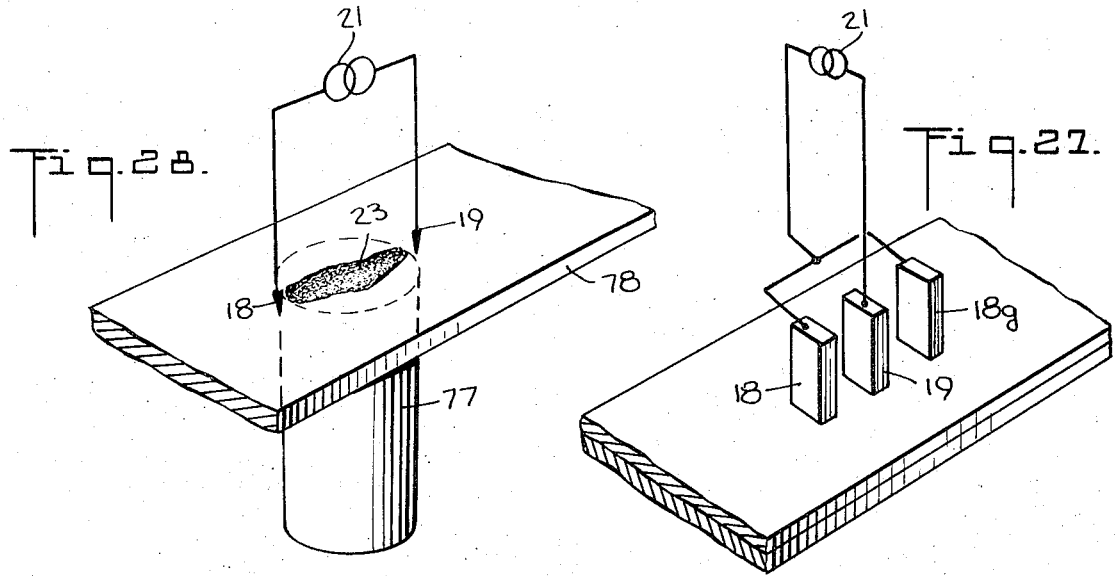
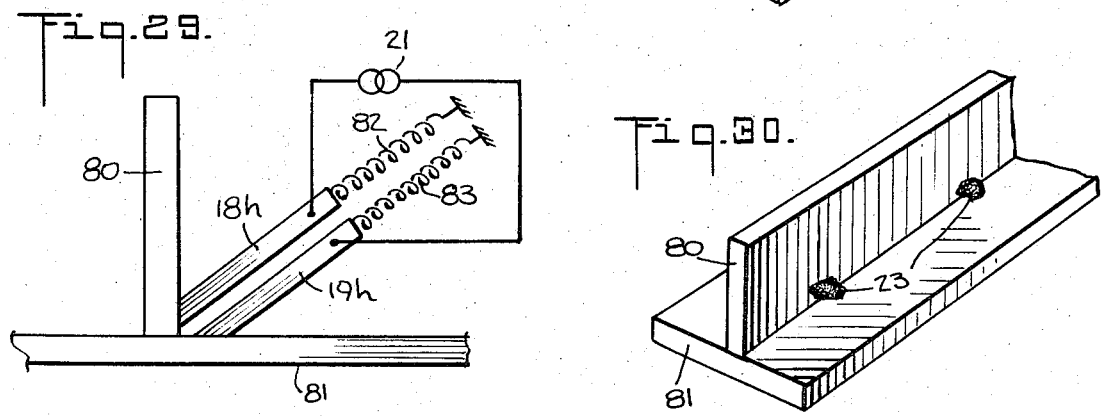
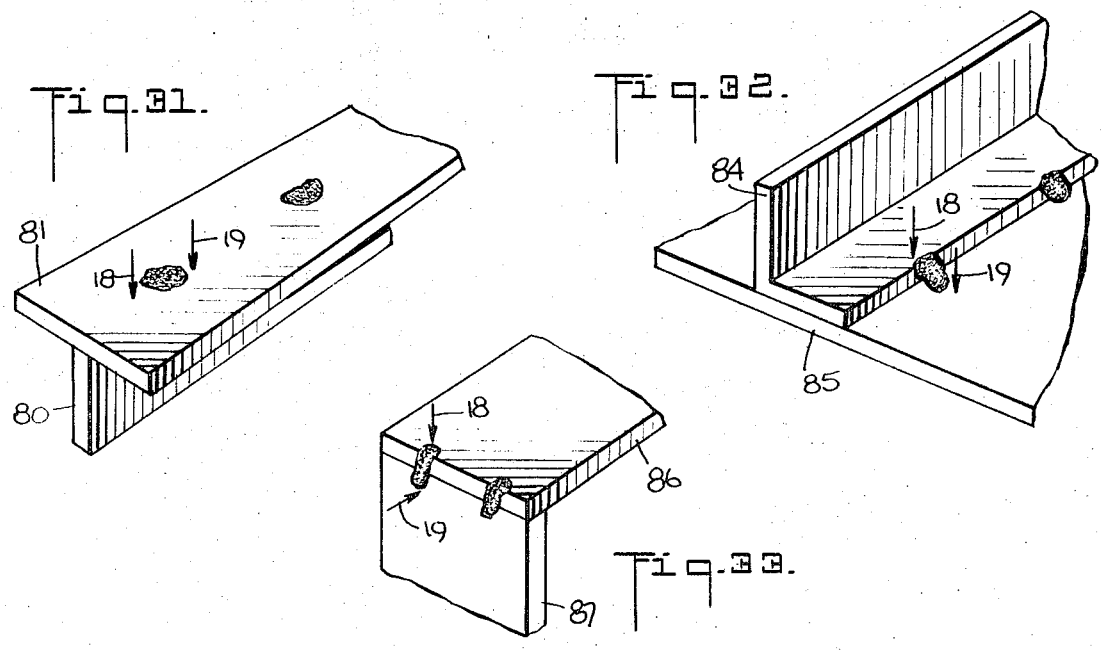

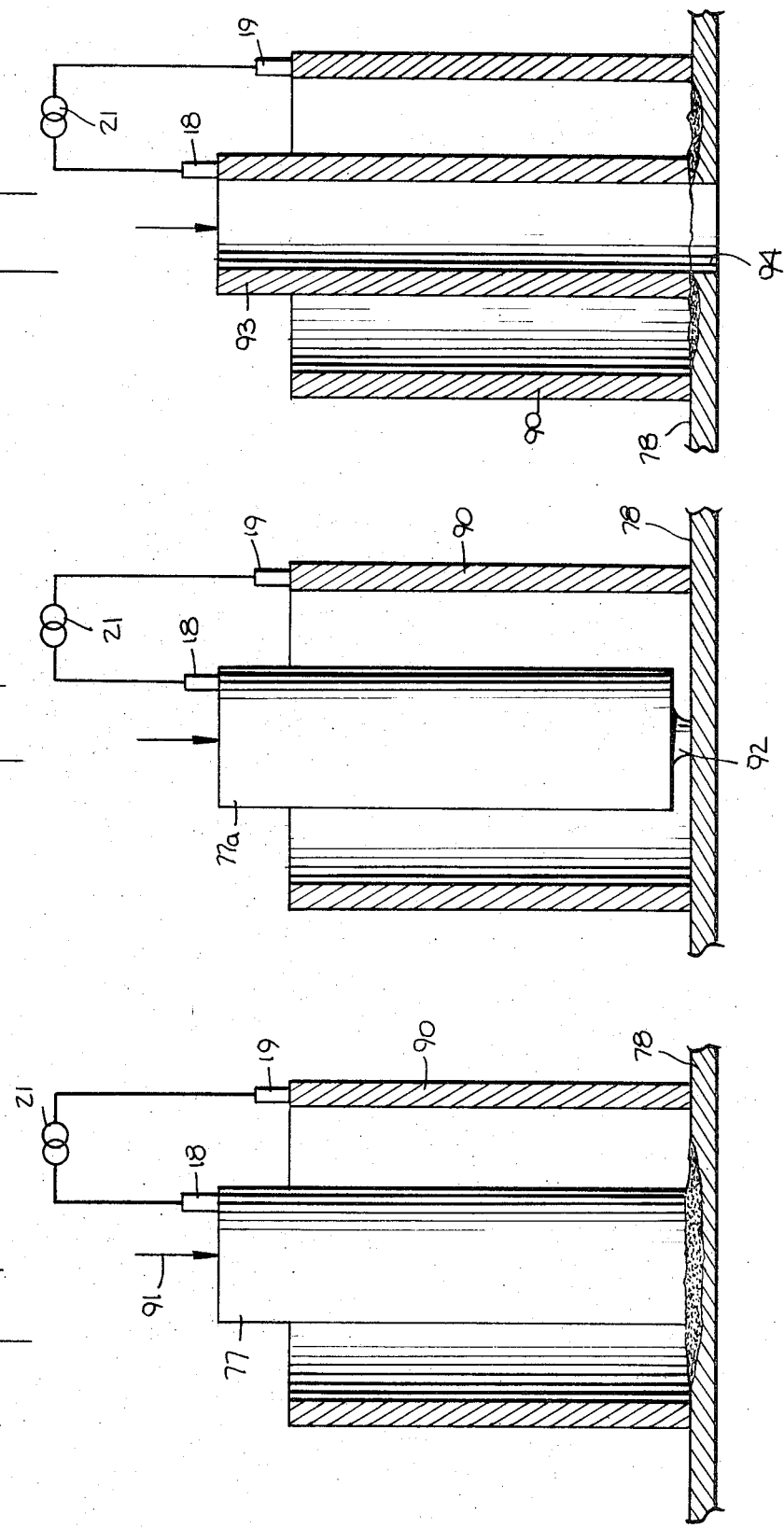

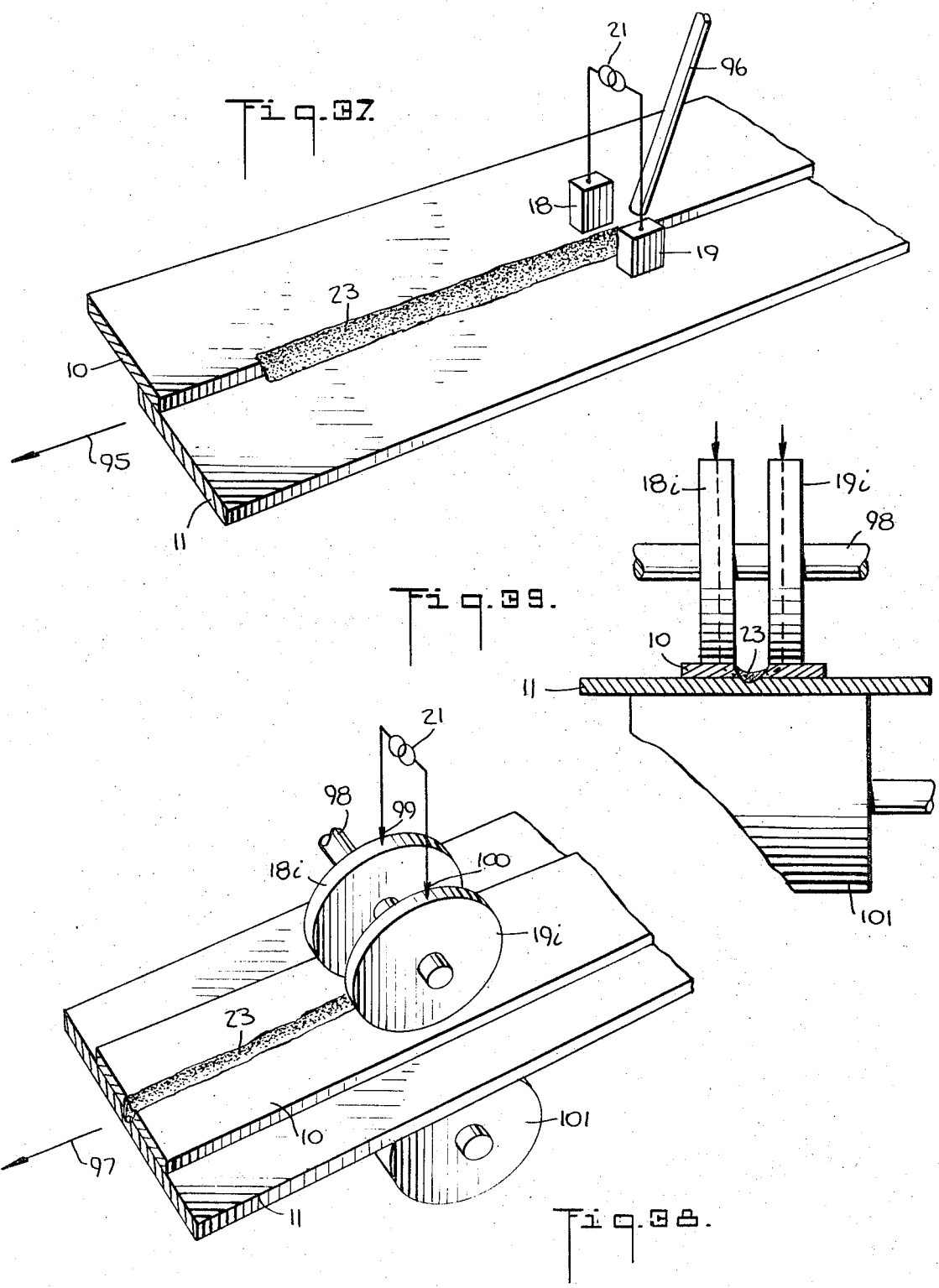

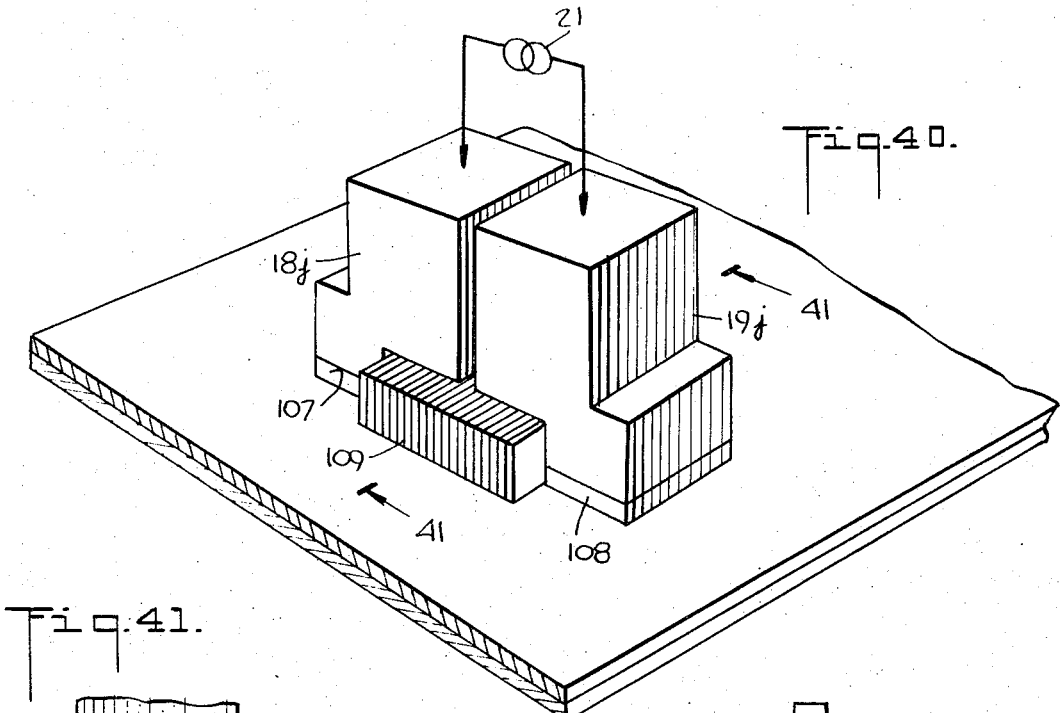
Fig.40.
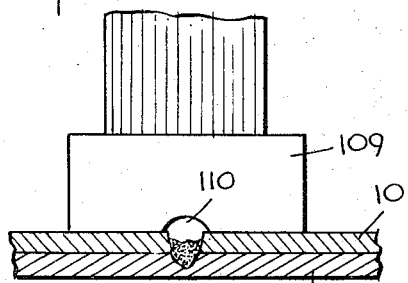
Fig.41.
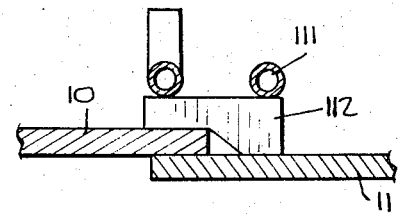
Fig.43.
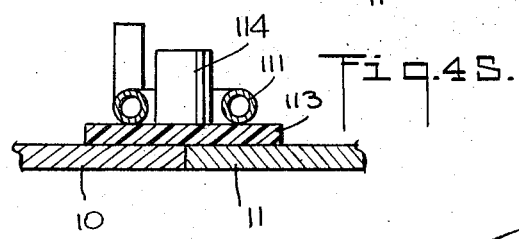
Fig.45.
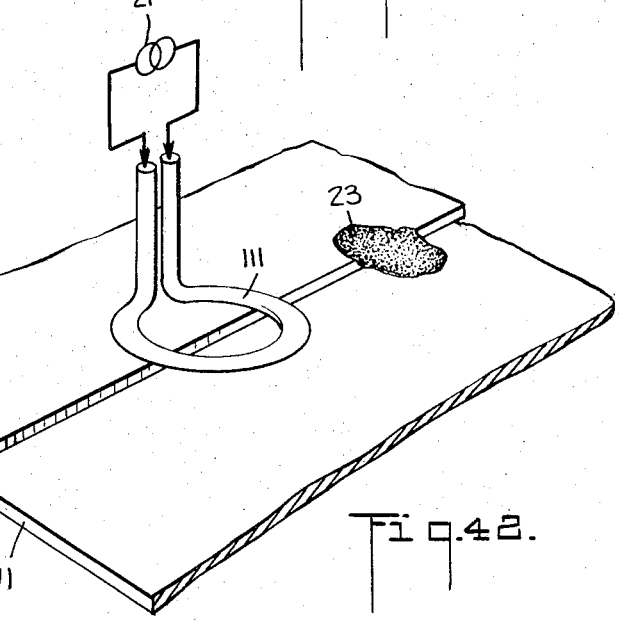
Fig.42.
Fig.44.

MELT WELDING BY HIGH FREQUENCY ELECTRICAL CURRENT

This invention relates to the melt or cast welding together of metal parts in which the metal at the portions of the parts to be welded together is rendered molten by passing an electric current therethrough and thereafter, the metal is permitted to cool and solidify and thereby form an intermetallic bond between such portions.

Melt or cast welding using electric current is known in the art and usually involves heating only the metal at the contacting surfaces of the parts to the melting point or points of the parts to be welded together. U.S. Pat. Nos. 2,625,637 and 3,022,407 illustrate such welding using an induction coil for inducing electric current in the metal of the parts adjacent to the surfaces to be welded together, such currents flowing in the reentrant paths concentric with the surfaces to be joined. Spot welding is another form of melt welding which relies upon the contact resistance between the parts at the spots thereon to be welded together to provide the desired restricted melting. In spot welding, the parts usually are passed together between a pair of electrodes, and the current is caused to flow through the parts from one electrode to another. Ordinarily, the frequency of the current is low, e.g., 60 hertz, and the current flows mainly in a straight line between the electrodes. Since the major resistance at low frequencies is at the point of contact between the parts, the metal at the point of contact heats to melting temperature prior to the time of melting of the metal spaced away from the point of contact and in the current path. This hot metal is then squeezed by the electrode pressure producing a cast and forged weld.

Since the ratio of contact resistance to effective resistance of the metal decreases with the frequency of the electric current, low frequency or direct current usually is considered desirable for spot welding. In addition, spot welding has been used mainly when oppositely facing surfaces of the parts are accessible for contact with the welding electrodes.

An exception to the spot welding methods hereinbefore described is described in U.S. Pat. Nos. 2,137,909 and 2,233,526, the former patent describing double spot, "blind" welding with both welding electrodes on one surface of the two parts to be welded together and current diverting apparatus and the latter describing similar welding using higher frequencies and special current diverting apparatus, to concentrate the electric current at the desired spots. However, the methods of both patents rely upon having a contact resistance between the parts which is greater than the effective resistance of the metal, and both patents suggest the use of special apparatus for the purpose of displacing the current away from the surface engaged by the electrodes and thereby increasing the current concentration at the "spots" of contact between the surfaces of the parts to be welded together and increasing the efficiency in producing melting at such "spots." Furthermore, substantial electrode pressure is required to accomplish the desired welding which, in turn, means that back-up devices able to withstand such pressure must also be employed.

If heating current is supplied to the parts as described in said U.S. Pat. Nos. 2,137,909 and 2,233,526, and if the current diverting apparatus is omitted, contrary to the teachings of the patents, the use of a heating current of a relatively low frequency and of a magnitude sufficient to melt the portion of the upper part which is between the electrodes would not produce a melt weld because the molten metal would fly out of the space between the electrodes due to the motor effect. In addition, the lower part would also melt between the electrodes, the molten metal of the latter part either flying out or dropping down thereby leaving a hole between the electrodes, and usually, the metal under the electrodes will melt thereby damaging the electrodes and/or causing them to stick to the upper part due to their contact resistance with the work. Similarly, if the current frequency is increased and the current is maintained at a magnitude which will provide melting at only the spots at the contacting surfaces below the electrodes, it will be found that the frequency will still be relatively low at a combination of current frequency and magnitude which will provide melting at such spots. While it may be found that a somewhat higher current frequency can be used to obtain melting at such spots when the current diverting apparatus described in the patents is also used, the metal of the part between the electrodes will not be melted under such conditions.

In accordance with the invention, the frequency of the electric current is selected so that the effective resistance of the metal along the weld line, or between opposite sides of the weld spot or "puddle", is at least equal to, and preferably, significantly greater than, the contact resistance between the surfaces of the parts to be welded together and so that the current, at least initially, has its maximum density at the surface of the part nearest the means for causing the current to flow in the parts, either contacting electrodes or an induction coil disposed as described hereinafter. Preferably, the current frequency also is selected, for certain types of welds, so that the reference depth in the metal of the parts, at welding temperature, is substantially equal to the depth of the desired weld, and if desired, devices, such as a proximity conductor, may be employed to concentrate the current at said surface. The magnitude and time duration of the current are selected in relation to the current frequency and the electrical and thermal properties of the parts so that metal of both parts melts at the desired weld portion during the application of the current, but the molten metal remains at the desired location and forms the desired weld after cooling. Because of the selection of a current frequency at which the metal has a relatively high effective resistance, the current magnitude may be made much smaller than the magnitude required for melting at lower frequencies, and therefore, the tendency of the molten metal to fly away from the desired location due to the motor effect is substantially less. Similarly, because of the control of the current depth which is made possible by such frequency selection, the duration of the current may be selected so that both parts are not melted through and thereby preventing the molten metal from dropping through and leaving a hole as would occur at low frequencies.

One object of the invention is to provide methods and apparatus for rapidly melt welding together a plurality of metal parts using high frequency electric current directed across the contacting surfaces of the parts and along at least one of the parts, the magnitude and time duration of said current being sufficient to melt at least said one part throughout its thickness at the weld area.

Another object of the invention is to provide methods and apparatus for rapidly melt welding together a plurality of metal parts using means for causing the current flow disposed at only one side of one of the parts.

A further object of the invention is to provide methods and apparatus for rapidly melt welding together a plurality of metals parts using contact electrodes at opposite ends of the portion to be melted and methods and apparatus for making the length of such portion greater than the spacing between such electrodes.

Other objects and advantages of the invention will be apparent to those skilled in the art from the following description of presently preferred embodiments of the invention which description should be considered in conjunction with the accompanying drawings in which:

FIG. 1 is a diagrammatic, perspective view of a preferred embodiment of the invention illustrating the welding together of a pair of metal plates or sheets which are overlapped at portions near their edge;

FIG. 2 is an enlarged, end elevation, cross-sectional view of a portion of the embodiment shown in FIG. 1 and is taken along the line 2—2 of FIG. 1;

FIG. 3 is a fragmentary, perspective view similar to FIG. 1 and showing the plates after they have been welded;

FIG. 4 is an enlarged, fragmentary, end elevation, cross-sectional view of the weld shown in FIG. 3 and is taken along the line 4—4 of FIG. 3;

FIG. 5 is a diagrammatic, perspective view similar to FIG. 1 and illustrates the welding together of overlapped plates with the current supplying contacts disposed in positions different from those shown in FIG. 1;

FIG. 6 is a diagrammatic, perspective view similar to FIG. 1 and illustrates the welding together of overlapped plates with the current supplying contacts disposed in positions different from those shown in FIGS. 1 and 5;

FIG. 7 is an enlarged, side elevation, cross-sectional view of a portion of the embodiment shown in FIG. 6 and is taken along line 7—7 of FIG. 6;

FIG. 8 is an end elevation view of a further embodiment of the invention in which an end portion of one of the metal plates or sheets surrounds the end portion of the other metal plate or sheet to which it is to be welded;

FIG. 9 is a diagrammatic, perspective view illustrating the welding together of a pair of overlapped metal plates or sheets at portions thereof spaced from the edges thereof;

FIG. 10 is a diagrammatic, perspective view illustrating the welding together of three overlapped metal plates or sheets;

FIG. 11 is a diagrammatic, perspective view illustrating the butt welding together of a pair of metal plates with current supplying contacts disposed in two different positions with respect to the contacting surface of the plates;

FIG. 12 is an enlarged, end elevation, cross-sectional view of a portion of the embodiment shown in FIG. 11 prior to the welding of the plates together and is taken along the line 12—12 indicated in FIG. 11;

FIG. 13 is a diagrammatic, perspective view illustrating the butt welding of three metal plates to three other metal plates;

FIG. 14 is a diagrammatic, perspective view of a further embodiment of the invention illustrating the welding together of the lip portions of a pair of metal members;

FIG. 15 is a diagrammatic, perspective view similar to FIG. 14 and showing the appearance of the parts after the weld has been made;

FIG. 16 is a diagrammatic, perspective view similar to FIG. 14 illustrating an embodiment of the invention in which the contacts are spaced along the lip portions of the metal plates;

FIG. 17 is a diagrammatic, perspective view similar to FIG. 14 illustrating the welding together of the lip portions of a pair of metal plates with the current supplying contacts disposed on the edge surfaces of the lip portions;

FIG. 18 is a diagrammatic, perspective view of an embodiment of the invention for the welding together of a ring gear and a stamped hub;

FIG. 19 is a cross-sectional view of the embodiment shown in FIG. 18;

FIG. 20 is a diagrammatic, perspective view illustrating a modified form of the apparatus shown in FIG. 9;

FIG. 21 is a side elevation view, partly in cross-section, of a portion of the embodiment shown in FIG. 20;

FIG. 22 is a diagrammatic, perspective view illustrating a modified form of contacts for supplying heating current to the metal plates;

FIG. 23 is a diagrammatic, perspective view of an embodiment of the invention in which the current supplying contacts are co-axial;

FIG. 24 is a cross-sectional view of a portion of the embodiment shown in FIG. 23;

FIG. 25 is a diagrammatic, perspective view showing a proximity conductor in connection with the current supplying contacts for enlarging the welding area when butt welding is being performed;

FIG. 26 is a diagrammatic, perspective view showing a proximity conductor in connection with the current supplying contacts for enlarging the weld area when lap welding is being performed;

FIG. 27 is a diagrammatic, perspective view illustrating apparatus for simultaneously producing a pair of welds between a pair of metal plates or sheets;

FIG. 28 is a diagrammatic, perspective view illustrating the use of the invention in connection with the welding of a metal stud to a metal plate;

FIG. 29 is an end elevation view of the welding of a metal plate at its edge surface to the side surface of another plate to form a T-beam;

FIG. 30 is a perspective view illustrating the welds produced by the apparatus illustrated in FIG. 29;

FIG. 31 is a perspective view illustrating another form of T-beam weld which may be produced in accordance with the invention;

FIG. 32 is a diagrammatic, perspective view illustrating a further form of T-beam weld which may be produced in accordance with the invention;

FIG. 33 is a diagrammatic, perspective view illustrating welds between a pair of metal plates which are at 90° with respect to each other and which may be welded in accordance with the invention;

FIGS. 34 and 35 are side elevation views, partly in cross-section, illustrating the welding of a metal stud to a plate;

FIG. 36 is a side elevation view, partly in cross-section, illustrating the welding of a tube to a plate;

FIG. 37 is a diagrammatic, perspective view of apparatus for producing a longitudinally extending weld between overlapped metal plates while the plates are moved with respect to the current supplying electrodes;

FIG. 38 is a diagrammatic, perspective view of a further embodiment for producing a longitudinally extending weld between a pair of plates while the plates are moved with respect to the current supplying electrodes;

FIG. 39 is a fragmentary, end elevation view of the apparatus illustrated in FIG. 35;

FIG. 40 is a diagrammatic, perspective view illustrating the use of magnetic core in connection with welding apparatus of the type illustrated in the preceding figures for the purpose of concentrating the current in the parts to be welded;

FIG. 41 is a fragmentary, end elevation, cross-sectional view of the apparatus shown in FIG. 37;

FIG. 42 is a diagrammatic, perspective view illustrating the use of an induction coil for supplying the heating current in accordance with the invention;

FIG. 43 is an end elevation view of a modified form of the apparatus shown in FIG. 42;

FIG. 44 is an end elevation view of a further modified form of the apparatus shown in FIG. 42; and FIG. 45 is an end elevation view of a further modified form of the apparatus shown in FIG. 42.

For a better understanding of the invention, it is desirable to call attention to certain phenomena associated with metal heating by electric currents. Thus, the heat developed is proportional to the square of the current times the effective resistance of the path through which the current flows. The effective path of the current depends upon the skin effect i.e., the increased density at the surface of the part, the proximity effect, i.e., the tendency of the current in the part to flow as near as possible to the conductor of an induction coil or to a proximity conductor carrying oppositely flowing current, and the reference depth, i.e., the equivalent depth assuming uniform current distribution to such depth, which is defined by the formula:

$$d \text{ inches} = 3160 \sqrt{p/uf}$$

where $p$ is the resistivity of the metal in ohm inches, $u$ is the relative magnetic permeability and $f$ is the frequency in cycles per second. It will be noted that reference depth decreases with frequency, which, in turn, means that the effective resistance increases with frequency. Since reference depth is also dependent upon permeability, and since magnetic materials such as steel lose their magnetic properties above a certain temperature (Curie point), it will be apparent that the reference depth for such materials progressively increases as they are heated.

The reference depth of current in a metal is determined from the formula set forth hereinbefore, and it is sometimes referred to as the depth in which 86% of the heat is developed. Typical reference depths, in thousandths of an inch, in various metals at 70°F, are as follows:

| Material | Frequency - Kilohertz | | | | |
|---|---|---|---|---|---|
| | 0.06 | 3 | 10 | 100 | 400 |
| Steel* | 41 | 6.6 | 2 | .59 | .30 |
| Aluminum | 430 | 110 | 33 | 10 | 5 |
| Brass | 640 | 150 | 50 | 16 | 8 |
| Copper | 336 | 85 | 26 | 8 | 5 |

*Below Curie Point; for non-magnetic steel or magnetic steel above Curie Point multiply by 100 for approximate value.

The width of current path in the part is also influenced by the use of magnetic pieces at the sides of the current path and by the shape and spacing of a proximity conductor carrying oppositely flowing current. At high frequencies the path of the major portion of the current is determined mainly by the reactance of the path rather than by the resistance thereof, and therefore, the major portion of the current may not follow the shortest path between two electrodes.

As mentioned hereinbefore, contact resistance decreases with increases in current frequency, and relatively small contacts and contact pressure can be used at high frequency as compared with those required at low frequency. In addition, at high frequency there is less heating at the points of contact, and whereas at low frequency the contacting surfaces of the electrodes and parts to be welded must be relatively clean, it is not necessary that such surfaces be clean when high frequency is used. In fact, the surfaces of the parts may have scale thereon.

Of course, heat is transferred to the portions of the part outside the path of current by conduction flow at a rate dependent upon the thermal conductivity of the metal, but, by rapidly heating the metal in the current path to a high temperature and then discontinuing the current flow, the temperature of such portions may be kept low as compared to that of the current carrying metal.

For all these reasons, the path of current flow and its effective dimensions, the heating and temperature obtained and the localization of the heating are dependent upon many factors including the presence or absence of a proximity conductor, the location of the induction coil, or the current supplying electrodes, with respect to the part to be heated, the time duration of current flow, the electrical and thermal characteristics of the metal, the configuration of the part being heated, the presence or absence of magnetic material adjacent the current path, etc. In accordance with the invention, use is made of such phenomena to localize and control the heating at the parts to be welded together and to melt portions of such parts without raising the temperature of the metal spaced a short distance from such portions to melting temperature.

FIG. 1 illustrates diagrammatically the melt welding together of the overlapping edge portions of a pair of metal sheets or plates 10 and 11. The sheet 10 has oppositely facing first and second surfaces 12 and 13, and the sheet 11 has oppositely facing first and second surfaces 14 and 15. A portion of the first surface 12 of the sheet 10 contacts a portion of the first surface 14 of the sheet 11 to provide contacting surface portions 16 therebetween. The portions of the sheet which are in overlapping relation are supported by a support 17 which may, for example, be a block of copper and which, if desired, may be water cooled.

Electrical heating current is supplied to the sheets 10 and 11 by a pair of contacts 18 and 19 which respectively contact a first area on the second surface 13 of the sheet 10 and a second area on the first surface 14 of the sheet 11, the edge 20 of the sheet 10 being disposed intermediate the contacts 18 and 19. The contacts 18 and 19 are shown diagrammatically and may be of a different cross-section from that shown, e.g., circular, square, etc. In the various embodiments described herein, the contacts usually are water cooled by conventional means, not shown, and are made of a good conductivity metal such as copper. However, the contacting faces thereof may be formed by a different metal having good resistance to wear.

The electrical current is supplied by a source 21 connected to the contacts 18 and 19 and the frequency of the current in the embodiment shown in FIG. 1, and in other figures described hereinafter, is such that the effective resistance of the metal between the contacts 18 and 19, and hence, in the path of the current flow therebetween, is at least equal to the contact resistance between the contacting surface portions 16. Of course, neither effective resistance nor contact resistance is actually measured in determining the ratio of the effective resistance to the contact resistance in accordance with the invention. Effective resistance can be calculated approximately in a well-known manner, but contact resistance is a variable dependent on many factors, such as contact pressure, surface characteristics, materials, frequency, etc. As used herein, the expression "effective resistance at least equal to the contact resistance between the parts" merely means that when the heating current is applied to the part, metal of the parts which is spaced from the point or points of contact between the parts and which is in the current path is heated by the current at least as rapidly as the metal at such point or points of contact, and therefore, reaches melting temperature at least as quickly as the metal at the point or points of contact.

Preferably, also, the frequency of the current supplied by the source 21 is such as to provide a reference depth in the metal of the sheets 10 and 11 which is less than the thickness of the metal between the first and second surfaces of the sheets 10 and 11. Thus, as illustrated in FIG. 2, the frequency and hence the reference depth, preferably are selected so that the current will at least initially be confined to near the surfaces of the sheets 10 and 11 as illustrated by the dotted lines 22 in FIG. 2. If the metal of the sheets 10 and 11 is magnetic steel, the reference depth will increase as the metal in the path of the current reaches a temperature at least equal to the Curie point temperature.

Of course, the frequency of the current must also be selected so that the magnitude of current will not only be small enough to prevent expulsion of the molten metal, but also be large enough to melt the desired metal within the time the current is supplied without melting other metal, such as beneath the contacts 18 and 19, of melting the metal through both sheets 10 and 11 between the contacts 18 and 19. As to the latter limitation, a current having a reference depth in the metal of the sheets 10 and 11 equal or greater than the thickness of the thinner of the two sheets 10 and 11, will cause melting of the metal between the contacts 18 and 19 but will also tend to melt the metal throughout the thickness of both sheets in the time required to provide the desired melting. In some cases, this may be permitted if means hereinafter described are disposed below the sheet 11 to prevent the molten metal from dropping out by gravity. Similarly, if the reference depth of the current is too small, the time required to melt through the thickness of the sheet 10 will be such that heat will spread by conduction outside the desired area and cause melting of metal outside the desired weld area. However, intermediate reference depths avoid such problems, because the current is confined mainly to the desired area between the contacts 18 and 19, and melting of the metal to be desired depth by conduction heating may be accomplished prior to melting of metal outside the desired area and melting of the metal completely through the sheets 10 and 11 may be avoided.

In the embodiment illustrated in FIGS. 1 and 2, the current when properly selected as described hereinbefore, will flow from the contact 18 to the contact 19 and vice versa near the surfaces of the sheets 10 and 11 which are nearest the contacts 18 and 19 and if the current is supplied with a magnitude and for a period of time sufficient to melt the metal of the sheets 10 and 11 intermediate the contacts 18 and 19, without melting of the metal beneath the contacts 18 and 19, and without expulsion of the molten metal due to the motor effect, a weld of the type illustrated in FIGS. 3 and 4 will be obtained after the molten metal has been permitted to cool. The molten metal may be permitted to cool and solidify either by merely discontinuing the heating current, by reducing the magnitude below that required to melt the metal and/or by forced cooling of the metal, such as by directing a fluid, e.g., air or water, on the molten metal.

As illustrated in FIGS. 3 and 4, the sheets 10 and 11 will be bonded together by metal 23 of such sheets which has previously been melted during the application of the current by means of the contacts 18 and 19. It will be noted that the melted metal is intermediate the contacts 18 and 19 and is not only formed by metal of the sheet 10 but metal of the sheet 11 which has been melted by reason of the flow of current between the contacts 18 and 19. However, it will also be noted that the metal at the areas of contact between the contacts 18 and 19 and the sheets 10 and 11 is not melted and metal on the side of the contact 19 opposite from the contact 18 and on the opposite side of the contact 18 and from the contact 19 has not been melted.

As mentioned hereinbefore, the extent of the melting of the metal is determined by several factors, including the frequency, time duration and magnitude of the heating current. The extent of melting is, of course, also affected by the properties of the metal of the sheets 10 and 11 and the dimensions thereof, and therefore, the best combination of conditions for producing the desired melt weld must be determined empirically. However, the considerations for determining the best combination of conditions will be described further hereinafter and examples of conditions found to be satisfactory for melt welding with specific configurations will be described hereinafter.

FIG. 5 illustrates an embodiment similar to the embodiment shown in FIG. 1, and differs from the embodiment shown in FIG. 1 in that the contacts 18 and 19 are disposed so that the path of the heating current, and hence, the melt weld, extends at an angle other than 90° to the edge 20 of the sheet 10. However, except for such variation in the positioning of the contacts 18 and 19, a melt weld between the sheets 10 and 11 is obtained in the manner described hereinbefore in connection with FIGS. 1–4.

In the preceding embodiments of the invention, one of the contacts is in contact with a surface of one metal part and the other contact is in contact with a surface of the other metal part. Thus, as illustrated in FIG. 2, the contact 18 engages the second surface 13 of the sheet 10 and the contact 19 engages the first surface 14 of the sheet 10, the current flowing transversely to the surfaces engaged at the points of contact, flowing transversely to the plane of the contacting surface portions 16 and therebetween and otherwise, flowing generally parallel to the surfaces contacted. The methods of the invention may also be used with both contacts on the same surface of one of the metal parts, but preferably, in such case, the reference depth is at least equal to the thickness of the metal part contacted and less than the combined thicknesses of the parts.

As illustrated in FIGS. 6 and 7, the contacts 18 and 19 may contact the second surface of the sheet 10 above the contacting surface portions 16, and by suitable selection of the current frequency, magnitude, and duration, the sheets 10 and 11 may be welded together by metal 23 between the contacts 18 and 19. As shown by dotted line 24 in FIG. 7, the current will flow generally parallel to the surface 13 intermediate the contacts 18 and 19 and transverse to the surface 13 and the plane of the contacting surface portions 16 beneath the contacts 18 and 19. However, as distinguished from the spot welding methods mentioned hereinbefore, melting will occur at the surface 13 prior to melting at the contacting surface portions 16 and will proceed downwardly with time. Accordingly, the depth of melting may be controlled by adjusting the duration and frequency of the current, but the frequency and magnitude of the current must be selected so as to provide an effective resistance for the metal of the sheet 10 which is at least equal to the contact resistance between the surface portions 16 and so as to provide a current magnitude which will not cause expulsion of all the molten metal and which will provide melting at the desired area only. With magnetic steel the initial reference depth usually will be less than the thickness of the sheet 10, but preferably, the final reference depth will be at least equal to the thickness of the sheet 10 but less than the combined thicknesses of the sheets 10 and 11.

The method described in connection with FIGS. 6 and 7 is particularly useful when it is desired to weld a sheet to another member and to avoid weld marks on the visible surface of such sheet. For example, it is common practice to weld a finish sheet to another sheet or member in the manufacture of automobile doors, and FIG. 8 is a fragmentary end elevation view illustrating the welding of such a sheet 25 to another sheet or member 26 using the method described in connection with FIGS. 6 and 7. Only one contact 18a is shown in FIG. 8, the other contact being spaced therefrom in the same manner as the contact 19 in FIG. 6. Both contacts engage the upper surface of the portion 27 of the sheet 25 which is bent around the edge portion of the sheet 26, and the weld is produced between the portion 27 and the sheet 26 without marring the remainder of the sheet 25.

In the embodiments illustrated in FIGS. 6–8, the sheets have been overlapped only adjacent their edges, but the methods described in connection with FIGS. 6–8 are equally applicable if the sheets 10 and 11 are overlapped to a greater extent and the contacts 18 and 19 are located at a portion of the sheet 10 which is spaced a greater distance from the edge of the sheet 10. Thus, as shown in FIG. 9, the sheets 10 and 11 may be substantially or fully overlapped. The contacts 18 and 19 may be located at any desired portion of the upper sheet 10, and a weld between the sheets 10 and 11 will be produced as described in connection with FIGS. 6 and 7.

The methods of the invention are also applicable to the welding together of more than a pair of sheets. As shown in FIG. 10, a further metal sheet 28 may be superimposed on the sheet 10 and a weld 23 may be produced between all three sheets using contacts 18 and 19 disposed as illustrated in FIGS. 1–3.

The methods of the invention are applicable to the butt welding of the sheets 10 and 11 with their edge surfaces in butting contact. Thus, as shown in FIG. 11, the contacts 18 and 19 may be disposed either at opposite sides of the contacting edge surfaces 29 or disposed so that contacts 18 and 19 bridge the contacting surfaces, the latter arrangement having the advantage that a good fit between the edge surfaces is not required. Of course, as in the preceding embodiments, the frequency is selected so that the effective resistance of the metal intermediate the contacts 18 and 19 is at least equal to the contact resistance between the contacting surfaces 29 and, preferably, the frequency is also selected so that the reference depth of the current in the metal of the sheets 10 and 11 is less than the thickness of the sheets 10 and 11. However, if devices described hereinafter for the retention of molten metal are used, the reference depth of the current may be at least equal to the thickness of the sheets 10 and 11.

FIG. 12 is an enlarged, cross-sectional view of the portion of the embodiment in FIG. 11 illustrating contacts 18 and 19 disposed on opposite sides of the contacting surfaces 29. As illustrated in FIG. 12, the current between the contacts 18 and 19 will be confined substantially to the paths indicated by the dotted lines 30 when the reference depth is less than the thickness of the sheets 10 and 11. The depth of the welding will normally be at least equal to the reference depth and, if desired, may extend throughout the thickness of the sheets 10 and 11 by maintaining the flow of heating current for a time longer than that required to melt the metal to the reference depth. To avoid the dropping out of molten metal from between the contacts 18 and 19 when the reference depth of the current is substantially equal to the thickness of the sheets 10 and 11, or when the current is maintained for a period of time sufficient to melt metal at a depth greater than the reference depth, a plate or block 31 of high temperature insulating material, such as silicon nitride, may be placed below the portions of the sheets 10 and 11 to be melted and in contact with the lower surfaces of such sheets 10 and 11.

The butt welding methods described in connection with FIGS. 11 and 12 may be employed for simultaneously butt welding together a plurality of metal sheets in excess of two. Thus, as illustrated in FIG. 13, additional metal sheets 32–35, having their edge surface in abutting relation and superimposed on the sheets 10 and 11, may be simultaneously welded together at their edges with contacts 18 and 19 disposed as illustrated in FIG. 11. The reference depth of the current in the metal of sheets 10 and 11 and 32–35 preferably is at least equal to the combined thickness of the two upper-most sheets, i.e., 32 and 33 or 34 and 35, so that the melting of the metal will be accomplished in a relatively short time and without heating of metal outside of the desired weld area to melting temperature during the application of the heating current.

FIG. 14 illustrates diagrammatically the use of the methods of the invention for the welding together of the upstanding lip portions 40 and 41 of a pair of metal members 42 and 43. The lip portions 40 and 41 have their first surfaces in contact with each other and their oppositely facing second surfaces 44 and 45 in contact with a pair of contacts 18b and 19b. The edge surfaces 46 and 47 of the lip portions 40 and 41 face in the same direction.

Although the contacts 18b and 19b may be the same as contacts 18 and 19, shown in the preceding figures, it is preferable, for the reasons set forth hereinafter, that each of the contacts comprises a contact portion 48, 49 and a proximity conductor portion 50, 51.

As in the previous embodiments, the effective resistance of the metal of the lip portions 40 and 41 between the contact portions 48 and 49 is at least equal to the contact resistance between the contacting surfaces 52 and, preferably, the frequency of the heating current provided by the source 21 is such that the reference depth thereof in the lip portions 40 and 41 is less than the thickness of each of such lip portions 40 and 41. However, by reason of the use of the proximity conductor portions 50 and 51, most of the high frequency current will flow along the surfaces of the lip portions, including the edge surfaces 46 and 47 thereof, even if the reference depth is equal to or greater than the thickness of the lip portions 40 and 41, so that when such proximity conductor portions 50 and 51 are employed the reference depth need not be less than the thickness of each of the lip portions 40 and 41.

When the reference depth of the current is less than the thickness of the lip portion 40 and the lip portion 41, and the proximity conductor portions 50 and 51 of the contacts 18b and 19b are omitted, the current will flow from one contact portion 48 to the other contact portion 49 and vice versa along the surfaces of the lip portions 40 and 41 rather than in the shortest path between the contact portions 48 and 49 and, therefore, the lip portions will melt at their surfaces prior to melting at greater depths. A similar effect will occur when the proximity conductor portions 50 and 51 are used.

FIG. 15 illustrates the weld 23 which is produced between the lip portions 40 and 41 when the apparatus and methods described in connection with FIG. 14 are employed. The depth of the weld metal 23 will depend upon the reference depth of the current employed and the magnitude and time duration of the current in the manner described hereinbefore.

In the embodiment of FIG. 14, the contacts 18b and 19b are disposed at opposite sides of the weld area and are separately connected to the high frequency source 21. If it is desired to produce a weld between the lip portions 40 and 41 which extends lengthwise thereof, the apparatus shown in FIG. 16 may be employed. In FIG. 16, a contact 18c having contact portions in contact with the oppositely facing surfaces 44 and 45 of the lip portions 40 and 41 is connected to one terminal of the source 21, and a contact 19c having contact portions also contacting oppositely facing surfaces 44 and 45 is connected to the other terminal of the source 21. When the current is supplied to the contacts 18c and 19c by the source 21, the current flows lengthwise of the lip portions 40 and 41 causing melting of the lip portions 40 and 41 between the contacts 18c and 19c which, after cooling of the molten metal, will form a weld between such lip portions 40 and 41. However, in the embodiment shown in FIG. 16, it is not important that the reference depth of the current be less than the thickness of the lip portions 40 and 41, and instead, the reference depth is determined mainly by the depth of the desired weld, as described in connection with FIGS. 11 and 12. However, in the embodiment shown in FIG. 16, the reference depth of the current in the metal of the lip portions 40 and 41 preferably is less than the height of the edge surfaces 46 and 47 thereof above the surfaces of the horizontally extending portions of the members 42 and 43. To aid in confining the molten metal a pair of blocks 31a and 31b of high temperature insulating material, similar to block 31, may be disposed as shown in FIG. 16.

A further method for producing a weld between the lip portions 40 and 41 is illustrated in FIG. 17. In the embodiment shown in FIG. 17, contacts 18 and 19 directly engage the edge surfaces 46 and 47 of the lip portions 40 and 41, and when current is supplied to the contacts 18 and 19, as described in connection with FIG. 16, a weld 23 is produced intermediate the contacts 18 and 19. The considerations in the selection of the frequency, magnitude and time duration of the heating current are essentially the same as those described for the embodiment shown in FIG. 16.

FIGS. 18 and 19 illustrate the welding of a stamped metal hub 53 having an upstanding lip portion 54 to a gear 55, only a portion of which is shown. One surface of the lip portion 54 contacts the edge surface 56 of the gear 55 and the contacts 18 and 19 engage the upper surface of the gear 55 adjacent the contacting surfaces. The hub 53 may be welded to the gear 55 in the manner described in connection with FIG. 17.

A high temperature insulating block 57 which may, for example, be made of ceramic, silicon nitride, Transite, etc., is disposed adjacent the lip portion 54 for the purpose of preventing the flow of molten metal away from between the contacts 18 and 19. During the heating of the metal to melting temperature, the block 57 will retain the molten metal between the contacts 18 and 19 and after the current has been discontinued, and the molten metal has cooled, a weld 23 will be produced between the lip portion 54 and the gear 55. When the metal has solidified, the block 57 may be removed.

FIGS. 20 and 21 illustrate a modification of the embodiment shown in FIG. 9, in which a block or plate 58 of high temperature insulating material, such as silicon nitride, is inserted between the modified contacts 18d and 19d. As mentioned hereinbefore, the molten metal tends to be expelled between the current supplying contacts due to the motor effect, and such expulsion of the metal may be kept to a minimum, even with relatively large magnitude currents, by covering the portion of the metal area to be welded by the block 58 of insulating material.

The contacts 18d and 19d differ from the contacts shown in FIG. 9 in that they have proximity conductor portions 59 and 60 similar to the proximity conductor portions 50 and 51 of the contacts 18b and 19b. Such proximity conductor portions 59 and 60 aid in concentrating the current along the path extending directly between the contacting portions 61 and 62 of the contacts 18d and 19d. The contacting portions 61 and 62 may be made of metal having a good wear resistance and an ability to withstand high temperatures.

As mentioned hereinbefore, the contacts may be of various sizes and cross-sectional shapes and usually they will be made of high conductivity metal, such as copper, except possibly at the contacting faces thereof, and usually will be internally water cooled. FIG. 22 illustrates a modified pair of contacts 18e and 19e which are water cooled but which have slots 65 and 66 at the sides thereof facing away from the metal to be melted for the purpose of permitting the cooling water to flow out of the contacts 18e and 19e and onto the sheet 10. Water is supplied to the passageways 67 and 68 in the direction of the arrows 69 and 70 and not only contacts the surfaces of the sheet 10 at the lower ends of the passageways 67 and 68, but flows outwardly through the slots 65 and 66 as indicated by the arrows 71 and 72. Such water flow aids not only in preventing melting of the metal beneath the contacts 18e and 19e, but also in maintaining the temperature of the metal outside of the desired weld area at a relatively low temperature. The water does not flow on the melt area, and the contacts can wear without any substantial change in cooling conditions.

FIGS. 23 and 24 illustrate a pair of co-axial contacts 18f and 19f for producing a circular weld 23 intermediate the contacts 18f and 19f. Preferably, at least the contact 18f is provided with water cooling by means of the central passageway 73, it being noted that the current concentration at the area of contact of the contact 18f with the sheet 10 is substantially greater than the current concentration at the area of contact of the contact 19f with the sheet 10.

If it is desired to increase the size of the weld area to a size greater than the path of the current which extends directly from one contact to another, the heating current from the source 21 may be supplied to at least one of the contacts 18 and 19 through a proximity conductor 74 as illustrated in FIGS. 25 and 26. As is well-known in the art, the proximity conductor 74 will cause the current to flow mainly in the metal along a path which closely follows the proximity conductor 74.

The proximity conductor 74 shown in FIG. 25 is connected between the source 21 and the contact 19 and comprises a first portion 75 in close proximity to and above the contacting edge surfaces 29 and a second portion 76 which is also close to the contacting surfaces 29 and to the upper surface of the sheet 11. In the embodiment in FIG. 25, the current instead of flowing substantially only along the shortest path between the contacts 18 and 19 will flow mainly in the metal of the sheets 10 and 11 along a path immediately beneath the proximity conductor 74, thereby heating the metal along the current path and below the proximity conductor 74 to melting temperature and producing a melt weld having a length substantially equal to the distance between the contact 18 and the portion of the proximity conductor 74 most remote from the contact 18. Part of the path of principal current flow is indicated by the dotted lines 74a.

FIG. 26 illustrates the use of a proximity conductor 74 in the manner described in connection with FIG. 25, except that the sheets 10 and 11 have overlapping edge portions. As indicated in FIG. 26, the current will follow a path indicated by the dotted lines 79, i.e., beneath the proximity conductor 74, and will produce a melt weld between the sheets 10 and 11 having a length substantially equal to the distance between the contact 18 and the portion of the proximity conductor 74 most remote from the contact 18. In the embodiment shown in FIG. 26, as well as in the embodiment in FIG. 25, the portion 76 of the proximity conductor 74 may be shorter so that the contact 19 will be farther from the contact 18 than is shown in FIGS. 25 and 26.

A pair of melt welds may be produced simultaneously using the method described in connection with FIGS. 6-9, and three contacts connected to the high frequency source as illustrated in FIG. 27. As shown in FIG. 27, a pair of contacts 18 and 18g are spaced substantially equally from an intermediate contact 19 with the latter contact connected to one terminal of the source 21. The contacts 18 and 18g are connected in parallel to the other terminal of the source 21, and the currents flowing from the contacts 18 and 18g to the contact 19 may be substantially equal. However, with different spacings of the contacts 18 and 18g with respect to the contact 19, the currents may be made unequal in a known manner.

The methods of the invention are applicable to the welding together of metal parts other than metal sheets and to the melt welding of sheets or plates to each other in relationships other than those described hereinbefore. For example, as illustrated in FIG. 28, a cylindrical stud 77 is shown in position to be welded to a plate 78. The stud 77 may extend into a hole in the plate 78 so that the upper surface of the stud 77, as viewed in FIG. 28, is flush with the upper surface of the plate 78, and, in such event, the reference depth of the current in the metal of the plate 78 is preferably less than the thickness of the plate 78. Of course, as in the preceding embodiments, the frequency of the current is such that the effective resistance of the metal between the contacts 18 and 19 is at least equal to the contact resistance between the stud 77 and the plate 78. By the application of the heating current to the plate 78, in the manner illustrated in FIG. 28, the metal intermediate the contacts 18 and 19 will become molten and after cooling such molten metal will form a weld 23 between the stud 77 and the plate 78.

The stud 77 may also be welded to the plate 78 without first forming a hole in the plate 78 into which the stud 77 is inserted. For example, the upper end surface, as viewed in FIG. 28, of the stud 77 may be pressed against the lower surface of the plate 78 and a melt weld between the plate 78 and the stud 77 may be produced by supplying heating current to the plate 78 through the contacts 18 and 19 in the manner described hereinbefore. However, with such an arrangement, the reference depth of the current in the metal of the plate 78 preferably is at least equal to the thickness of the plate 78 and preferably, the contacts 18 and 19 are spaced apart by a distance no greater than the diameter of the stud 77.

FIGS. 29 and 30 illustrate the welding of a metal plate 80 at its edge surface to a major surface of a metal plate 81 to form a T-beam. The weld between the plate 80 and the plate 81 is produced by melting the metal intermediate a pair of contacts 18h and 19h which are resiliently pressed respectively against the plate 80 and the plate 81 by springs 82 and 83, the contacts 18h and 19h being connected to the source 21 as illustrated.

Preferably, the reference depth of the current in the metal of the plates 80 and 81 is less than the thickness thereof, and after the metal has been rendered molten and permitted to cool, welds 23 of the type illustrated in FIG. 30 will be obtained.

FIGS. 31-33 illustrate other uses of the methods of the invention for the production of melt welds between metal members variously disposed with respect to each other. In the embodiment in FIG. 31, a T-beam is produced by melt welding the plate 80 to the plate 81 using the method illustrated and described in connection with FIGS. 6-9.

FIG. 32 illustrates the welding of a metal angle member 84 to a plate 85 using the methods described in connection with FIGS. 1-4.

FIG. 33 illustrates the use of the methods described in connection with FIGS. 1-4 for the welding of a plate 86 to a plate 87 at a right angle thereto.

FIG. 34 illustrates the welding of the cylindrical stud 77 to the plate 78 in a manner different from the manner described in connection with FIG. 28. In effect, in FIG. 34, the stud 77 corresponds to the center contact 18f and the outer hollow cylinder 90 corresponds to the contact 19f described in connection with FIGS. 23 and 24. However, as distinguished from the contact 18f, the stud 77 is not cooled and is pressed downwardly against the surface of the plate 78 in the direction of the arrow 91 by conventional means with a force which is relatively large as compared with the force applied to the contact 18f. In the preferred embodiment, the effective resistance of the metal of the plate 78 intermediate the stud 77 and the cylinder 90 is approximately equal to the contact resistance between the end of the stud 77 which engages the surface of the plate 78 at the frequency of the current. Also, the reference depth of the current in the plate 78 is less than the thickness of the plate 78. When the current is supplied to the stud 77 and the cylinder 90 by the source 21, the metal intermediate the stud 77 and the cylinder 90, as well as the metal at the lower end of the stud 77 and the metal of the plate 78 engaging the stud 77, will melt so that when the molten metal is cooled a weld is formed between the stud 77 and the plate 78. Although the time duration and magnitude of the current supplied from the source 21 will be sufficient to cause melting of at least the surface of the plate 78, it is not necessary, with the application of sufficient force in the direction of the arrow 91, to actually melt the lower end of the stud 77, heating of the metal of such lower end to a relatively high temperature being sufficient to cause the metal of the stud 77 to bond to the molten metal at the surface of the plate 78. In effect, under such latter conditions, a combined forge and melt weld is produced.

It will be noted that the current concentration at the lower end of the stud 77 is greater than the current concentration at the surfaces of contact between the cylinder 90 and the plate 78. For the purpose of increasing the current concentration, and hence the heating at the lower end of the stud 77, the stud may be formed at its lower end so as to further increase the current concentration. Thus, as shown in FIG. 35, the stud 77a has a projection 92 at the lower end thereof, which projection 92 has a smaller area of contact with the plate 78 than the stud 77 shown in FIG. 34.

FIG. 36 illustrates the welding of a metal tube 93 to the plate 78 in the manner described in connection with FIG. 34. The tube 93 may, for example, be a boiler tube and the plate 78 may have an aperture 94 therein which is co-axial with the bore of the tube 93.

In the embodiments illustrated in FIGS. 34-36, only one stud 77 or 77a or one tube 93 is being welded to the plate 78 at any given time. However, if desired, a plurality of studs or tubes could be simultaneously welded to a plate 78 by connecting a plurality of studs 77 or 77a or tubes 93 and the associated cylinders 90 in series with the source 21.

In the embodiments described hereinbefore, the contacts have been maintained stationary with respect to the metal parts to be welded together during the application of the heating current and the melting of the metal in the desired weld area. If desired, a seam weld rather than an isolated melt weld may be produced by moving the contacts with respect to the metal parts or by moving the metal parts with respect to the contacts during the application of the heating current. The time of application of the heating current to any predetermined area is, in this case, controlled by the rate of relative movement of the contacts and the parts rather than by turning the current on and off.

FIG. 37 illustrates the production of a seam weld 23 at the overlapping edge portions of the plates or sheets 10 and 11, using the methods described in connection with FIGS. 1-4, but causing relative movement of the contacts 18 and 19 and the plates or sheets 10 and 11 during the application of the heating current. For example, the contacts 18 and 19 in FIG. 37 may be held stationary and have sliding contact with the plates or sheets 10 and 11 and the latter may be moved in the direction of the arrow 95 while the current is supplied thereto from the source 21. The rate of movement of the plates or sheets 10 and 11 in the direction of the arrow 95 is selected so that molten metal is continuously produced between the contacts 18 and 19 as the sheets or plates 10 and 11 are moved relative to the contacts 18 and 19.

In the embodiment illustrated in FIG. 37, as well as in the embodiments described previously and hereinafter, an inert gas and/or a welding flux may be supplied to the area in which the molten metal is produced by means of a tube 96. The inert gas, e.g., nitrogen, will assist in reducing oxidation, and the supplying of a welding flux is for the well-known purposes thereof.

FIGS. 38 and 39 illustrate the production of a seam weld between a pair of plates or sheets 10 and 11 using the methods described in connection with FIGS. 6-9, using relative movement between the contacts 18i and 19i and the metal plates or sheets 10 and 11 and using roll contacts rather than sliding contacts. The plates or sheets 10 and 11 may be moved in the direction of the arrow 96 while the roll contact 18i and 19i are permitted to rotate, the roll contacts 18i and 19i being of high conductivity metal, such as copper, and being supported on an insulating shaft 98. High frequency current from the source 21 is supplied to the roll contacts 18i and 19i by brushes 99 and 100, and preferably, the roll contacts 18i and 19i are water cooled. The sheets 10 and 11 may be supported by a rotatable roller 101.

The embodiments illustrated in FIGS. 37-39 may also be used to produce a series of spaced melt welds by causing intermittent relative movement between the contacts and the metal parts, the current being supplied while the contacts and the parts are stationary.

As mentioned hereinbefore, the current may be caused to concentrate along the desired path by the use of a proximity conductor or proximity conductor means interconnecting the current source with one or more of the contacts. Also, as mentioned hereinbefore, magnetic material disposed at the sides of the current path will aid in increasing the current concentration in such path.

FIG. 40 illustrates the use of both proximity conductor means and a magnetic member to aid in concentrating the current in a relatively narrow path between the current supplying contacts. The contacts 18j and 19j illustrated in FIG. 40 are similar to the contacts 18d and 19d described in connection with FIG. 20, and comprise contacting portions 107 and 108.

The current may be concentrated in the desired path by the use of the magnetic member 109 intermediate the contacting portions 107 and 108. The magnetic member 109 may, for example, be a plurality of laminations of magnetic steel or when the current frequency is relatively high, may be made of a magnetic ceramic material.

As is best seen from an examination of FIG. 41, the magnetic member 109 has a channel 110 therein so that the magnetic material of the member 109 is spaced from the current path in the vertical direction with respect to the upper surface of the plate or sheet 10. However, the magnetic member 109 contacts the upper surface of the plate or sheet 10 at each side of the desired current path. Because of such configuration of the member 109, the width of the current path is reduced without causing substantial deflection of the current into the metal of the sheet 10.

In the various embodiments described hereinbefore, the current is supplied to the parts to be welded by means of contacts engaging one or more surfaces of the parts. As illustrated in FIG. 42, the current may be supplied to the parts and caused to flow in the desired weld area by means of a relatively small induction coil 111, sometimes known as a "pancake" coil. The induction coil 111 is maintained in closely spaced relation with the surfaces of the plates or sheets 10 and 11, and substantially encircles the area where the molten metal is to be produced. The considerations for the production of a melt weld using the induction coil 111 rather than contacts for supplying the heating current are essentially the same as those which apply when contacts are employed, and the weld produced with the induction coil 111 is essentially the same as the weld produced when contacts are employed. A typical weld 23 is illustrated in FIG. 42.

As illustrated in FIG. 43, a shaped block 112 of high temperature insulating material, such as silicon nitride, may be placed between the induction coil 111 and the surfaces of the plates or sheets 10 and 11, for both restricting the flow of molten metal and keeping to a minimum the loss of molten metal due to the motor effect. The block 112 may also act as a support or spacer for the coil 111.

FIG. 44 is similar to FIG. 43 but illustrates a plate 113 of insulating material and a core 114 of magnetic material within the induction coil 111. The core 114 of magnetic material aids in increasing the amount of current induced in the sheets 10 and 11 in a well-known manner.

FIG. 45 is similar to FIG. 44 but illustrates the butt welding together of a pair of metal sheets or plates 10 and 11 using the induction coil 111, the plate of insulating material 113 and the core 114 of magnetic material.

A plate of insulating material may also be disposed below the sheets in the manner illustrated in FIG. 12.

One known type of apparatus for supplying high frequency current for welding purposes comprises a high frequency oscillator, a high frequency transformer, leads for interconnecting the transformer with the oscillator and with the contacts or the induction coil and water cooling equipment for cooling the transformer, the leads and the contacts or induction coil. The electrical power loss in the transformer, the leads, the contacts, etc. may be as high as 40–50% of the power at the output of the oscillator, and while it is a simple matter to measure the output power of the oscillator, it is difficult to measure the power in the parts being welded. However, by adjusting the power output of the oscillator, the power in the parts to be welded may be adjusted, the power in the parts increasing with an increase in the oscillator output and vice versa. Furthermore, the amount of power required in the parts to provide the desired welding is, for the reasons mentioned hereinbefore, dependent upon many factors. Accordingly, the most suitable conditions of power, frequency, etc. for welding together a specific pair of metal parts in a specific relation usually must be determined empirically. General guidelines for initially approximating the most suitable conditions are as follows:

1. Since, at high frequencies, the current concentrates in a relatively narrow path regardless of the area of contact between the current supplying contacts and the metal parts, such area of contact may be relatively small, e.g., one-half inch by one-half inch for each current supplying contact.

2. Unless special devices, such as the proximity conductor described in connection with FIGS. 25 and 26, are used, the size of the molten metal area preferably is no more than about one-half inch in diameter or one-half inch square and the current supplying contacts should engage the metal parts closely adjacent the metal area to be melted.

3. With current supplying apparatus of the type hereinbefore described, the maximum output power of the oscillator should be about 100 kilowatts for a molten metal area about one-quarter inch square in order to prevent excessive expulsion of molten metal.

4. The frequency of the current is selected so as to provide an effective resistance for the metal parts which is at least equal to the contact resistance between the parts.

5. The frequency of the current is also selected as a function of the metal thickness for lap and butt welds and as a function of the metal thickness and desired depth of the weld from the lip edges for lip welds. Thus, for thicker metals the frequency may be lower.

6. For lap welds of the type described in connection with FIGS. 1–5 and 10, the reference depth preferably is less than the thickness of the thinner of the upper and lower metal part or parts. For lap welds of the type described in connection with FIGS. 6–9, that is, with both contacts on a surface of one part, the reference depth preferably is at least equal to the thickness of the part contacted by the contacts and less than the combined thickness of the overlapped metal parts. However, if devices to retain molten metal described in connection with FIGS. 12 and 45 are used to prevent molten metal from dropping out of the lowermost part, the reference depth may, in some cases, be equal to or slightly greater than the combined thickness of the overlapped metal parts. Also, if relatively long welding times, e.g., about eight seconds, are acceptable, satisfactory welds may be produced with a reference depth of one-half the thickness of the upper metal part and with relatively lower power, the melting to the desired depth and into the lower part or parts resulting from thermal conduction.

7. For butt welds of the type described in connection with FIGS. 11-13, the reference depth preferably is less than the thickness of the parts on opposite sides of the butting surfaces. However, as in the case of lap welds, a reference depth equal to or slightly greater than the thickness of the parts may, in some cases, be used if shorter time and devices to prevent molten metal from dropping out from between the contacts are also used.

8. For lap welds with contacts engaging oppositely facing surfaces of the lips, as in FIG. 14, the reference depth preferably is less than the thickness of each lip and, if possible, equal to the desired depth of the weld from the edge surfaces of the lips. However, with contacts having proximity conductor portions, as described in connection with FIG. 14, the reference depth may be equal to the thickness of the lip of greater thickness, particularly if said devices to prevent loss of molten metal are used. Also, if the reference depth is less than the thickness of a lip, the current may be supplied until the depth of the weld has reached the desired value.

9. For other lap welds, e.g., FIGS. 16 and 17-19, in which the contacts are spaced in the direction of the plane of the contacting surfaces, the reference depth is determined mainly by the desired depth of the weld and the height of the lips.

10. Preferably, in all cases, the reference depth is at least equal to one-half of the desired depth of melting.

11. The duration of the heating current is selected so that the desired melting is obtained without significant expulsion of molten metal or significant softening of the metal beneath the contacts. Thus, if the power is increased to the extent required to perform the desired melting of magnetic steel within 0.1 second, much of the molten metal will be expelled. Generally speaking, the time duration for such steel should be about 0.25 to 3 seconds, but may be up to 8 seconds when the metal part is thicker than the reference depth. Except for lip welds, which involve other considerations mentioned hereinbefore, the preferred time duration range is 0.25 to 2 seconds when the reference depth is greater than the thickness of the metal part.

12. Because the effective resistance is higher at higher frequencies, the heating current, and hence, the tendency of the molten metal to be expelled, will be less with higher frequencies, e.g., 400 kilohertz, even if the heating current duration is relatively short, e.g., 0.25 - 3 seconds. On the other hand, lower frequencies, e.g., 3 kilohertz, may be used in some cases even though larger currents may be involved provided that the magnitude of the current is kept small enough to prevent significant molten metal expulsion by increasing the time duration of the current.

13. The parts to be welded together may be made of the same metal or different metals, but when different metals are involved, the different metals should have melting temperatures which are relatively near and should be metals capable of alloying when they are melted.

14. Metals which tend to harden, such as high carbon steels, when cooled rapidly may be heated, either before or after the melting of the metal, by causing a heating current to flow in the weld area which is smaller than the amount of current required to melt the metal. Such smaller current may be supplied by the same apparatus as is used to perform the melting and the magnitude thereof may be varied with time.

Typical examples for welding conditions which have been found to produce satisfactory welds with mild 1010 steel and the embodiment shown in FIG. 6 are as follows:

EXAMPLE I

| | |
|---|---|
| Oscillator output - | 25-50 kilowatts |
| Current frequency - | 450 kilohertz - nominally |
| Reference depth - | approximately 0.00029 inch below Curie point (1330°F approximately) and 0.029 inches above Curie point |
| Current duration - | 0.5 sec. at 25 kw. and 0.25 sec. at 50 kw. |
| Thickness of sheets - | 0.0313 inch |
| Amount of overlap - | ⅜ inch |
| Weld Area - | 3/16 inch by 3/16 inch approximately |

EXAMPLE II

| | |
|---|---|
| Oscillator output - | 50-100 kilowatts |
| Current frequency - | 450 kilohertz -nominally |
| Reference depth - | as in Example I |
| Current duration - | 4 sec. at 50 kw. and 2 sec. at 100 kw. |
| Thickness of sheets - | 0.0625 inch |
| amount of overlap - | ⅜ inch |
| Weld area - | as in Example I |

Example III

| | |
|---|---|
| Generator output - | 50-100 kilowatts |
| Current frequency - | 10 kilohertz -nominally |
| Reference depth - | approximately 0.002 inch below Curie point and 0.2 inch above Curie point |
| Current duration - | 6 sec. at 50 kw. and 3 sec. at 100 kw. |
| Thickness of sheets - | 0.125 inch |
| Amount of overlap - | ⅜ inch |
| Weld area - | as in Example I |

As a further example, tests were conducted in connection with the welding of a steel ring gear having an internal diameter of 14 inches to a stamped metal hub in the manner described in connection with FIGS. 18 and 19. The current frequency was approximately 10 kilohertz and the results were as follows:

EXAMPLE IV

| Generator Power | | Contact Spacing | Current Duration | Remarks |
|---|---|---|---|---|
| 50-60 | kilowatts | 5/16 inch | 1 second | heating but no melting |
| 35 | do. | 5/16 inch | 3 seconds | melting and welding with some metal run-out |
| 26 | do. | 5/16 inch | 4 seconds | do. |
| 55 | do. | 3/8 inch | 3 seconds | dam of ceramic as in FIG. 19 - melting and welding without run-out |

In the various embodiments, metal can, if desired, be added to the weld area during the melting of the metal of the parts, such as by feeding a metal wire, metal powder or metal chips, into the molten metal or by placing metal powder or chips on the weld area prior to the melting of the metal of the parts.

Although only preferred embodiments of the invention have been described, it will be understood by those skilled in the art that various modifications may be made without departing from the principles of the invention.

What is claimed is:

1. The method of melt welding together a plurality of metal parts, at least one of said parts having at least a portion of its surface in contact with at least a portion of the surface of another of said parts to provide contacting surface portions between said one part and said other part and the weld being at and adjacent said contacting surface portions, said method comprising causing a high frequency electric current to flow in the parts in a direction which extends from a first area on a surface of said one part which is spaced from said contacting surface portions to a second area spaced from said first area and on a surface of one of said parts other than the contacting surface portion thereof, said current having a frequency such that the effective resistance of the metal between said first and second areas is at least equal to the contact resistance between said contacting surface portions and the time duration and magnitude of said current being sufficient to melt the metal of said one part and at least a portion of the metal of said other part which is intermediate said first and second areas without dislodging all of the molten metal from between said first and second areas, and thereafter, causing said molten metal to cool and solidify.

2. The method as set forth in claim 1, wherein said high frequency electrical current is caused to flow in the parts by applying contacts to said first and second areas and by supplying said current to said contacts.

3. The method of melt welding together a plurality of metal parts, at least one of said parts having at least a portion of its surface in contact with at least a portion of the surface of another of said parts to provide contacting surface portions between said one part and said other part and the weld being at and adjacent said contacting surface portions and being metal of said parts which has melted and then solidified, said method comprising causing a high frequency electric current to flow from a first area on a surface of said one part which is spaced from but adjacent said contacting surface portions to a second area on one of said surfaces which is spaced from said first area and which is spaced from but adjacent to the contacting surface portions, said current having a frequency such that the effective resistance of said metal is at least equal to the contact resistance between said contacting surface portions, and the time duration and magnitude of said current being sufficient to melt the metal of said one part and at least a portion of the metal of said other part intermediate said first and second areas without dislodging all of the molten metal between said first and second areas and without melting metal of said parts which is respectively on the opposite side of said second area with respect to said first area and on the opposite side of said first area with respect to said second area, and thereafter, causing the molten metal to cool and solidify.

4. The method as set forth in claim 3, wherein said plurality of parts are a pair of metal parts each having oppositely facing first and second surfaces and having a predetermined thickness between said first and second surfaces, wherein the first surface of one of said parts is in contact with the first surface of the other of said parts, wherein said high frequency electric current is caused to flow in the parts by applying contacts to said first and second areas and by supplying said current to said contacts.

5. The method as set forth in claim 4, wherein the frequency of said current is also such that the reference depth of said current in the metal of said parts is less than the combined thickness of said pair of parts.

6. The method as set forth in claim 4, wherein the frequency of said current is also such that the reference depth of said current in the metal of said one part is less than the thickness of said one part.

7. The method as set forth in claim 4, wherein said first and second areas are both on said second surface of said one part.

8. The method as set forth in claim 4, wherein only a portion of said first surface of said one part contacts only a portion of said first surface of said other part and wherein said first and second areas are respectively on the second surface of said one part and the first surface of said other part whereby said current flows from said first area along the second surface of said one part, across said contacting surfaces and along the first surface of said other part to said second area.

9. The method as set forth in claim 4, wherein only a portion of said first surface of said one part contacts only a portion of said first surface of said other part and wherein said first and second areas are both on the second surface of said one part whereby said current flows from said first area and along the second surface of said one part to said second area.

10. The method as set forth in claim 3, wherein said plurality of parts are a pair of metal parts each having oppositely facing first and second surfaces and an intermediate edge surface and having a predetermined thickness between said first and second surfaces, wherein the edge surface of one of said parts is in contact with the edge surface of the other of said parts, wherein said first area is on one of said first and second surfaces of said one part and said second area is on the corresponding surface of said second part and wherein said high frequency electric current is caused to flow in the parts by applying contacts to said first and second areas and by supplying said current to said contacts, whereby said current flows from said first area along the surface of said one part, across the contacting edge surfaces and along the surface of said other part to said second area.

11. The method as set forth in claim 10, wherein the frequency of said current is also such that the reference depth of said current in the metal of said parts is less than the thickness of said one part.

12. The method as set forth in claim 3, wherein said plurality of parts are a pair of metal parts each having oppositely facing first and second surfaces and an intermediate edge surface and having a predetermined thickness between said first and second surfaces, wherein the edge surface of one of said parts is in contact with the edge surface of the other of said parts, wherein said first area is on both one of said first and second surfaces of said one part and on the corresponding surface of said other part, wherein said second area is on both of the surfaces which have said first area thereon, wherein said high frequency electric current is caused to flow in the parts by applying contacts to said first and second areas and by supplying said current to said contacts, whereby said current flows from said first area along the surfaces of both said parts to said second area.

13. The method as set forth in claim 3, wherein said plurality of metal parts are a pair of metal parts each having an upstanding lip portion, each lip portion having oppositely facing first and second surfaces and an intermediate edge surface and having a predetermined thickness between said first and second surfaces, wherein the first surface of one said lip portion is in contact with the first surface of the other lip portion and the edge surfaces of both parts face in the same general direction, wherein said first area is on the second surface of said one lip portion and said second area is on the second surface of said other lip portion and wherein said high frequency electric current is caused to flow in the parts by applying contacts to said first and second areas and by supplying said current to said contacts, whereby said current flows from said first area along the surface of said one part, across the contacting edge surfaces and along the surface of said other part to said second area.

14. The method as set forth in claim 13, wherein the frequency of said current is also such that the reference depth of said current in the metal of said parts is less than the thickness of said one part.

15. The method as set forth in claim 3, wherein said plurality of metal parts are a pair of metal parts each having an upstanding lip portion, each lip portion having oppositely facing first and second surfaces and an intermediate edge surface and having a predetermined thickness between said first and second surfaces, wherein the first surface of one said lip portion is in contact with the first surface of the other lip portion and the edge surfaces of both parts face in the same general direction, wherein said first and second areas are on said edge surfaces and wherein said high frequency electric current is caused to flow in the parts by applying contacts to said first and second areas and by supplying said current to said contacts, whereby said current flows from said first area along the edge surfaces of said lip portions.

16. The method as set forth in claim 13, wherein the frequency of said current is also such that the reference depth of said current in the metal of said parts is less than the height of the lips portions above the remainder of said parts.

17. The method as set forth in claim 3, wherein said plurality of parts are a pair of metal parts, one of said parts having oppositely facing first and second surfaces and the other of said parts having an upstanding lip portion with oppositely facing first and second surfaces and having an intermediate edge surface, wherein said first surface of said lip portion is in contact with a surface of said one part, wherein said first area is on a surface of at least one of said parts other than the surface portion thereof which contacts the other part and said second area is on a surface of at least the other of said parts other than the surface portion thereof which contacts said one part and wherein said high frequency electric current is caused to flow in the parts by applying contacts to said first and second areas and by supplying said current to said contacts and wherein the frequency of said current is such that the reference depth in the metal of said one part is less than the distance between said first and second surfaces thereof.

18. The method as set forth in claim 17, wherein said one part has an edge surface intermediate the first and second surfaces thereof, wherein said edge surface of said one part is the surface thereof in contact with said first surface of said lip portion, and wherein the first and second areas are on both the first surface of said one part and said edge surface of said other part.

19. The method as set forth in claim 17, wherein said first surface of said one part is the surface thereof in contact with said edge surface of said other part and wherein said first area is on said first surface of said one part and said second area is on the second surface of said lip portion.

20. The method as set forth in claim 3, wherein said plurality of parts are a pair of metal parts each having oppositely facing first and second surfaces and at least one of said parts having an intermediate edge surface, wherein said edge surface of said one part is in contact with the first surface of the other of said parts, and wherein said first area is on the first surface of said one part and said second area is on a portion of the first surface of said other part other than the portion thereof which contacts said edge surface.

21. The method as set forth in claim 3, wherein said plurality of parts are a pair of metal parts each having oppositely facing first and second surfaces and at least one of said parts having an intermediate edge surface, wherein said edge surface of said one part is in contact with the first surface of the other of said parts, and wherein said first area is on the first surface of said one part and said second area is on the second surface of said other part.

22. The method as set forth in claim 3, wherein said plurality of parts are a pair of metal parts each having oppositely facing first and second surfaces and at least one of said parts having an intermediate edge surface, wherein said edge surface of said one part is in contact with the first surface of the other of said parts, and wherein said first and second areas are on the second surface of said other part and are at the portion of said last-mentioned second surface which is opposite from said edge surface.

23. The method as set forth in claim 22, wherein the frequency of said current is such that the reference depth thereof in the metal of said other part is greater than the thickness of said other part between the first and second surfaces thereof.

24. The method as set forth in claim 3, wherein said current is caused to flow in the parts by disposing an induction coil adjacent the parts and extending substantially only from and intermediate said first area to said second area and by supplying said current to said induction coil.

25. The method of melt welding together a plurality of metal parts, at least one of said parts having at least a portion of its surface is contact with at least a portion of the surface of another of said parts to provide contacting surface portion between said one part and said other part and the weld being at and adjacent said contacting surface portions, said method comprising causing a high frequency electric current to flow in the parts in a direction which extends from a first area on a surface of said one part which is spaced from said contacting surface portions to a second area spaced from said first area and on a surface of one of said parts other than the contacting surface portion thereof, said current having a frequency such that the effective resistance of the metal between said first and second areas is at least equal to the contact resistance between said contacting surface portions and the time duration and magnitude of said current being sufficient to melt at least the metal of said one part which is intermediate said first and second areas without dislodging all of the molten metal from between said first and second areas, and thereafter, causing said molten metal to cool and solidify.

26. The method as set forth in claim 25, wherein said other part is a stud and said portion of the surface of said other part is an end surface of said stud and wherein said high frequency electrical current is caused to flow in the parts by applying contacts to said first and second areas and by supplying said current to said contacts.

27. The method as set forth in claim 25, wherein said other part is a tube and said portion of the surface of said other part is an end surface of said tube and wherein said high frequency electrical current is caused to flow in the parts by applying contacts to said first and second areas and by supplying said current to said contacts.

* * * * *

UNITED STATES PATENT OFFICE
CERTIFICATE OF CORRECTION

Patent No. 3,860,778          Dated January 14, 1975

Inventor(s) WALLACE C. RUDD AND HUMFREY N. UDALL

It is certified that error appears in the above-identified patent and that said Letters Patent are hereby corrected as shown below:

Col. 7, line 57 - "of" should read --or--

Col. 8, line 9 - "be" should read --the--

Col. 10, line 63 - "face" should read --faces--

Col. 24, line 59 - "is" should read --in--

Col. 24, line 61 - "portion" should read --portions--

Signed and sealed this 11th day of March 1975.

(SEAL)
Attest:

RUTH C. MASON
Attesting Officer

C. MARSHALL DANN
Commissioner of Patents
and Trademarks